United States Patent
Koravos et al.

(10) Patent No.: US 10,132,441 B2
(45) Date of Patent: Nov. 20, 2018

(54) MANUFACTURING AND INSTALLATION OF INSULATED PIPES OR ELEMENTS THEREOF

(71) Applicant: Cabot Corporation, Boston, MA (US)

(72) Inventors: Jason J. Koravos, Billerica, MA (US); Andries J. Du Plessis, Billerica, MA (US); Matthew B. Greenfield, Billerica, MA (US); Aaron H. Johnson, Billerca, MA (US); Thomas Michael Miller, Billerica, MA (US)

(73) Assignee: Cabot Corporation, Boston, MA (US)

( * ) Notice: Subject to any disclaimer, the term of this patent is extended or adjusted under 35 U.S.C. 154(b) by 28 days.

(21) Appl. No.: 15/146,431

(22) Filed: May 4, 2016

(65) Prior Publication Data
US 2016/0319983 A1   Nov. 3, 2016

Related U.S. Application Data

(62) Division of application No. 12/990,349, filed as application No. PCT/US2009/042294 on Apr. 30, 2009, now abandoned.

(60) Provisional application No. 61/049,483, filed on May 1, 2008, provisional application No. 61/152,122, filed on Feb. 12, 2009.

(51) Int. Cl.
| F16L 59/14 | (2006.01) |
| F16L 59/02 | (2006.01) |
| F16L 59/10 | (2006.01) |
| F16L 59/12 | (2006.01) |
| C04B 38/06 | (2006.01) |

(52) U.S. Cl.
CPC ............ *F16L 59/143* (2013.01); *C04B 38/06* (2013.01); *F16L 59/024* (2013.01); *F16L 59/026* (2013.01); *F16L 59/027* (2013.01); *F16L 59/10* (2013.01); *F16L 59/12* (2013.01); *Y10T 29/49826* (2015.01)

(58) Field of Classification Search
CPC ...... F16L 59/143; F16L 59/024; F16L 59/026
USPC ........................................................ 138/149
See application file for complete search history.

(56) References Cited

U.S. PATENT DOCUMENTS

| 1,681,731 A | 8/1928 | Gottwald |
| 1,846,550 A | 2/1932 | Gottwald |
| 1,852,164 A | 4/1932 | Holzwarth |
| 1,897,478 A | 2/1933 | Holzwarth |
| 2,010,020 A | 8/1935 | Holzwarth |
| 2,468,902 A | 5/1949 | Villiger |
| 2,706,496 A | 4/1955 | Bond |

(Continued)

FOREIGN PATENT DOCUMENTS

| WO | 2005032943 A2 | 4/2005 |
| WO | 2005033432 A1 | 4/2005 |
| WO | 2009134992 A2 | 11/2009 |

OTHER PUBLICATIONS

Office Action, dated Oct. 5, 2015, from related European Patent Application No. 09739794.7.

(Continued)

*Primary Examiner* — Vishal Pancholi

(57) ABSTRACT

Insulated pipe systems or assemblies include a particulate, composite or monolithic insulating aerogel material. Techniques for installing or manufacturing such systems or assemblies are described, as are components useful in the installation or manufacture processes.

20 Claims, 16 Drawing Sheets

(56) References Cited

U.S. PATENT DOCUMENTS

| | | | |
|---|---|---|---|
| 2,790,464 A * | 4/1957 | Stephens | B29D 23/001 138/140 |
| 2,918,183 A | 12/1959 | Petersen et al. | |
| 3,032,070 A * | 5/1962 | Isenberg | F16L 59/10 138/149 |
| 3,379,027 A | 4/1968 | Mowell et al. | |
| 3,873,163 A | 3/1975 | Gladish | |
| 3,874,181 A * | 4/1975 | Pogonowski | B21D 39/20 138/28 |
| 4,616,960 A | 10/1986 | Gladish | |
| 4,680,070 A * | 7/1987 | Hughes | B29C 53/38 138/149 |
| 4,732,513 A | 3/1988 | Lenhart | |
| 4,978,253 A | 12/1990 | Lazzari | |
| 5,310,594 A * | 5/1994 | Holland | B29C 44/5654 138/118.1 |
| 5,400,828 A | 3/1995 | Ziu et al. | |
| 5,497,809 A | 3/1996 | Wolf | |
| 5,547,331 A | 8/1996 | Podd et al. | |
| 5,786,059 A | 7/1998 | Frank et al. | |
| 5,789,075 A | 8/1998 | Frank et al. | |
| 5,953,818 A * | 9/1999 | Matthews | B32B 3/30 29/890.144 |
| 6,145,547 A | 11/2000 | Villatte | |
| 6,709,600 B2 | 3/2004 | Hrubesh et al. | |
| 6,887,563 B2 | 5/2005 | Frank et al. | |
| 2003/0091776 A1* | 5/2003 | Gregorio | B29D 23/001 428/36.91 |
| 2004/0134556 A1 | 7/2004 | Manini et al. | |
| 2005/0046086 A1 | 3/2005 | Lee et al. | |
| 2005/0072488 A1 | 4/2005 | Rouanet et al. | |
| 2005/0074566 A1 | 4/2005 | Rouanet et al. | |
| 2005/0167891 A1 | 8/2005 | Lee et al. | |
| 2006/0272727 A1 | 12/2006 | Dinon et al. | |

OTHER PUBLICATIONS

Office Action, dated Apr. 26, 2016, from related European Patent Application No. 09739794.7.
Office Action, dated Sep. 25, 2017, from related European Patent Application No. 09739794.7.
Office Action, dated Jan. 17, 2017, from related European Patent Application No. 09739794.7.
Office Action, dated Jan. 26, 2018, from related European Patent Application No. 09739794.7.

* cited by examiner

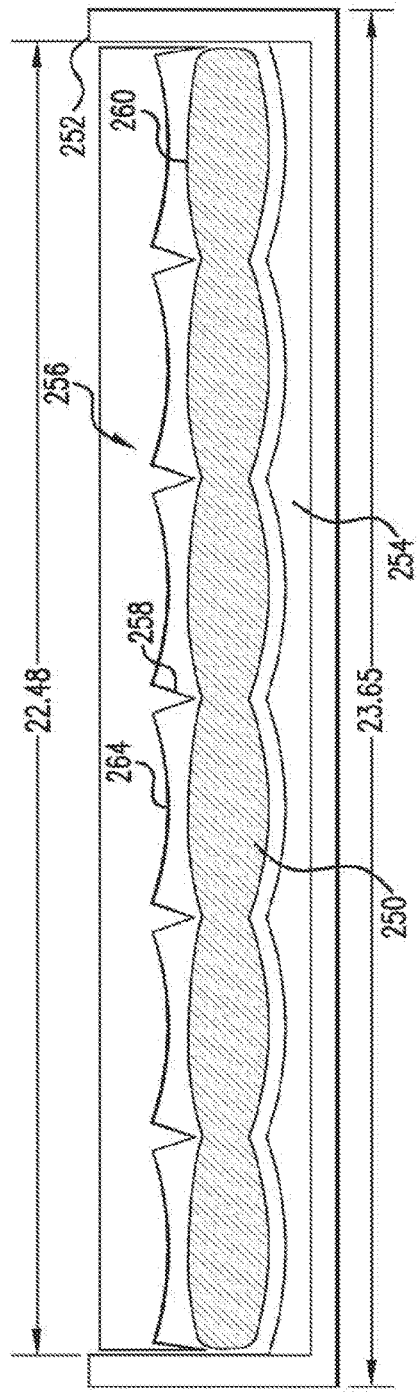
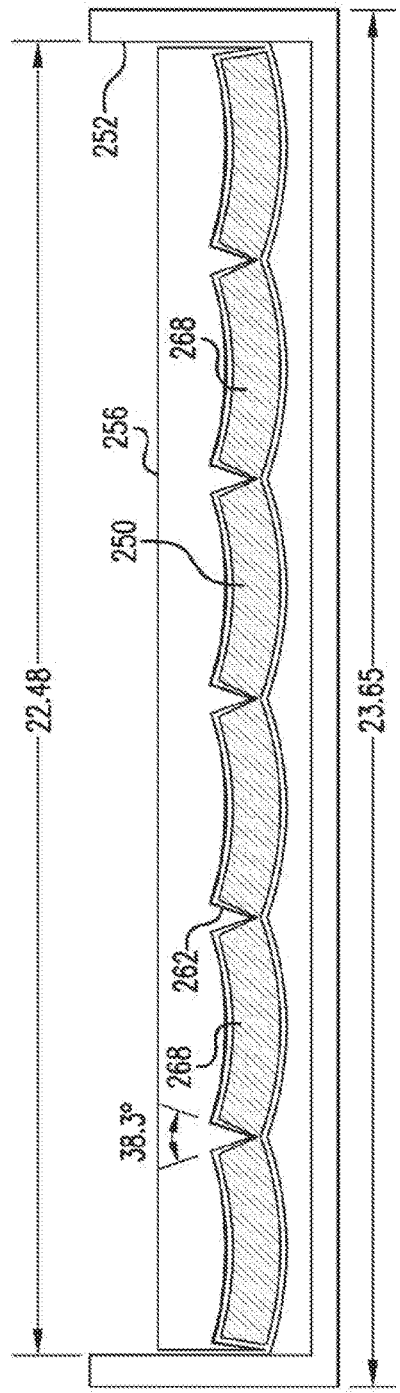
FIG.8A
FIG.8B

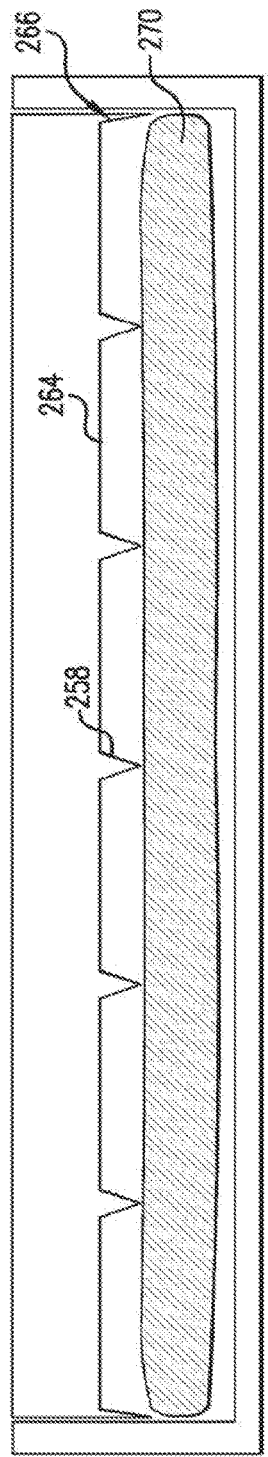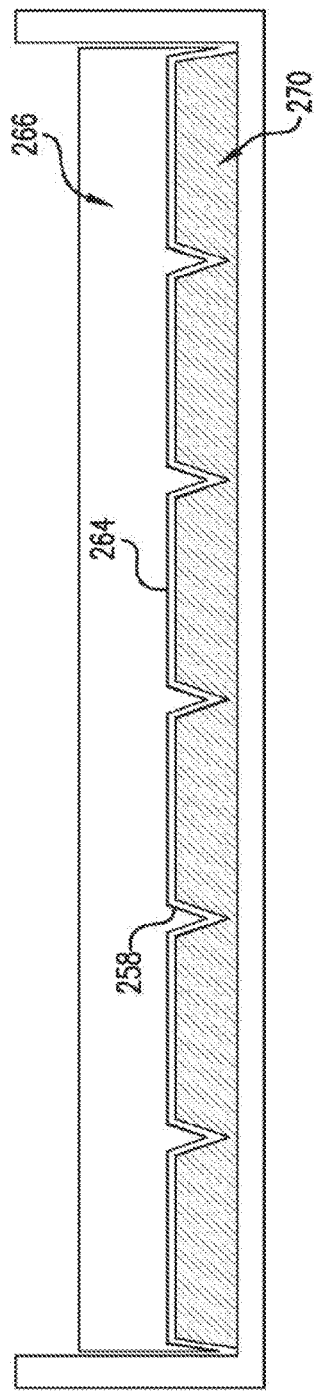

MANUFACTURING AND INSTALLATION OF INSULATED PIPES OR ELEMENTS THEREOF

RELATED APPLICATIONS

This application is a Divisional of U.S. patent application Ser. No. 12/990,349 filed on Apr. 14, 2011, which is a U.S. National Phase Application of International Application No. PCT/US2009/042294 filed Apr. 30, 2009, which claims the benefit under 35 U.S.C. § 119(e) of U.S. Provisional Patent Application No. 61/049,483, filed on May 1, 2008, and U.S. Provisional Application No. 61/152,122, filed on Feb. 12, 2009, all of which are incorporated herein by reference in their entirety.

BACKGROUND OF THE INVENTION

In deep-water hydrocarbon (e.g. oil, gas or mixtures thereof) extraction, crude oil or gas is extracted from below the sea floor and transferred via a pipeline system to the surface of the water. It is critically important to maintain the temperature of the oil or gas flowing through the pipeline, which typically is extracted at elevated temperatures (e.g., 60-300° C.), at temperatures above about 40° C. to avoid the precipitation of solid materials and hydrates which can lead to plugging of the pipeline and can interfere with production. As the water temperature at great depths is slightly above freezing temperature (e.g. about 4° C.), provision must be made to insulate the pipelines.

Further, if oil or gas flow must be interrupted for well maintenance or because of inclement weather conditions affecting surface platforms and interrupting pumping operations, it is important to maintain the temperature of residual crudes and gases within the pipeline and other components of the pipeline system (e.g., Christmas trees or subsea trees, risers, and the like) above precipitation temperatures for the particular crudes or gases being extracted in order to minimize or completely avoid the expensive and production-interrupting necessity of declogging and/or flushing the pipeline system before resuming production.

To this end, many efforts have been undertaken to provide economical and efficacious solutions to the problem of insulating underwater oil and gas pipeline systems. A well-accepted method is to provide a pipeline comprising a pipe-in-pipe system wherein an inner pipe is surrounded by an outer pipe serving as a carrier pipe, and wherein the annular space defined by inner pipe and outer pipe contains an insulating material. For example, U.S. Pat. No. 6,145,547 discloses a pipe-in-pipe assembly comprising a self-sustaining plate of microporous material surrounding an inner carrier pipe and encased by an outer carrier pipe, wherein a free passageway is provided for longitudinal gas flow. The assembly is maintained at reduced pressure for improved thermal insulation.

U.S. Patent Application Publication 2004/0134556 A1 discloses a heat insulating system for tubular bodies (e.g., a pipe-in-pipe assembly) comprising at least two superimposed evacuated panels, each of which is separately placed around the inner pipe of the pipe-in-pipe assembly, and wherein the two opposed edges defining gaps of each of the at least two panels are placed so as not to coincide and thus eliminate a continuous passageway for the transfer of heat between the inner and outer pipes.

Similarly, there is great interest in pipelines for transporting liquefied hydrocarbons (e.g. liquefied natural gas, liquefied propane gas). In this case, thermal insulation is required to maintain the low temperature of the liquefied natural gas (about −163° C.) to avoid vaporization of the liquid due to heat transfer from the warmer surroundings.

Additionally, steam injection is often employed to maintain reservoir pressure in oil and gas fields as the fields become depleted and thus to maintain production at an economic rate. In such a technique, steam must be transported to the production site, which is often distant from the site of steam generation. Accordingly, thermal insulation of the steam-carrying pipes is required to prevent condensation of the steam.

The use of polyurethane foam in pipe-in-pipe systems is commonly known by those practiced in the art. Some polyurethane foam pipe-in-pipe systems adhesively bond the inner and outer pipes to allow for load transfer. While this method can be acceptable, once excessive force breaks the adhesive bond, the value of longitudinal load transfer (and, potentially, radial load transfer) is lost.

The transfer of hot fluids and cryogenic fluids (for example industrial gases such as oxygen, nitrogen, argon and hydrogen) in industrial plants, HVAC systems, steam heating systems for corporate, municipality, or university campuses and buildings) and many other environments also requires insulation. In some of these cases, the outer pipe is a simple cover comprising a material such as aluminum cladding or PVC pipe.

Many existing methods of insulating pipe-in-pipe assemblies remain deficient in numerous respects. Pre-formed insulating panels and the like, of necessity retain gaps in insulation when placed within pipe-in-pipe assemblies, both between their opposing edges and between ends when laid end-to-end, allowing for heat transfer between inner and outer pipes, which reduces insulation efficiency and requires greater amounts of insulating materials.

Maintenance of reduced pressure within the annular space of some pipe-in-pipe assemblies places great demands on forming vacuum-tight assemblies and places the performance of the assembly at risk should the vacuum be compromised. Some insulating materials such as polyurethane foam lose insulation efficiency and/or shape over service life. Other insulating materials require the use of a larger diameter outer pipe to accommodate sufficient insulating material due to less efficient insulation capabilities.

SUMMARY OF THE INVENTION

Pipe-in-pipe assemblies such as those disclosed in U.S. Patent Application Publication No. 2006/272727 A1, titled Insulated Pipe and Method for Preparing Same, to Dinon et al. published on Dec. 7, 2006, present many advantages over conventional arrangements. Because of their attractive features, methods and systems addressing the design, manufacturing and installation of such assemblies, or of components thereof, continue to be needed. Also needed are further developments in designs for insulating pipes and fabrication processes.

In some aspects, the invention relates to pipe and pipe assemblies or components thereof. In other aspects, the invention relates to manufacturing insulating elements that can be utilized to provide insulation to pipe in pipe arrangements or to other gap spaces. Examples of insulating elements include packs, also referred to herein as containers. In further aspects, the invention relates to methods for assembling insulated pipe in pipes.

In one embodiment, a system includes an inner pipe structure; an outer pipe structure and an insert having a plurality of holes for directing gas at a moving surface of at least one of the inner pipe structure and the outer pipe structure.

In another embodiment, an insulated pipe structure includes a pipe having an outer surface; an insulating material warped over the outer surface to form an insulating layer; and at least one layer surrounding an exterior surface of the insulating layer.

In a further embodiment, an insulated pipe structure includes a pipe having an outer surface; an insulating material at the outer surface, wherein the insulating material is in a notched or a bubble wrap container; and an optional cover layer.

In yet another embodiment, a method for preparing a pipe-in-pipe assembly includes expanding a flow pipe to reduce an annular space between the flow pipe and an outer pipe, thereby compressing an insulating material present in the annular space.

In another embodiment, a structure for a deploying an insulating material in a pipe-in-pipe assembly includes a container housing the insulating material in a compressed state; and a sheath surrounding an outer surface of the container and attached to the container at discrete locations.

In still another embodiment, a method for deploying an insulating material in a pipe-in-pipe assembly includes rupturing a container holding compressed insulating material and having a sheath surrounding an exterior surface of the container, wherein the sheath is dimensioned for limited expansion of the insulating material and is attached to the container at discrete locations.

In a further embodiment, a method for producing a pipe-in-pipe assembly includes enveloping a pack holding compressed insulating material with a sheath, wherein the sheath is dimensioned to contain deployed insulating material at a desired diameter; and breaching the container to deploy the insulating material within the sheath.

In yet another embodiment, a method for producing a container includes filling a casing with a particulate insulating material; closing the casing to form a closed container; pressing the closed container in a mold to form a shaped container; and applying a vacuum to the shaped container to reduce the pressure inside the container.

In a further embodiment, a method for compressing an arched container includes exerting pressure on a hinge at a top region of the arched container, causing edges of the arched container to move from a relaxed position to a constrained position, thereby compressing the arched container.

In another embodiment, a method for manufacturing a flexible container in a compressed configuration includes molding a container in an uncompressed configuration to form indentations at one face of the container, thereby compressing insulating material in un-indented regions.

In yet another embodiment a heat protective system includes a pouch containing one or more heat distribution panels, the pouch being wrappable around a container insulating a pipe.

In still another embodiment, a method for protecting an insulated pipe during welding includes wrapping a pouch including one or more heat distribution panels around a container insulating a pipe.

The invention can be employed to simplify manufacturing and/or installation of pipe-in-pipe arrangements. In some aspects, the use of composite aerogel material wrapped around a flow pipe can eliminate the need for an outer pipe. Techniques disclosed herein facilitate assembly of insulating systems and are particularly useful in handling and sliding heavy piping. When the insulation material itself aids in stress transfer, the pipe-in-pipe design can be thinner and/or can include fewer bulkheads and/or spacers. As bulkheads and spacers are generally made of materials that are significantly weaker insulators when compared with insulating materials such as aerogels, reducing the number and/or width of these bulkheads and spacers over the length of the system will improve thermal performance while lowering cost and complexity.

By using a mechanical rather than an adhesive bond and by their "spring back" nature, materials used can spring back to their original form even after experiencing the type of compression that would destroy adhesive bonds used in conventional polyurethane foam systems, and consequently can continue to mechanically bond the system.

Many other advantages will become apparent in the detailed description of various embodiments of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIGS. 8A and 8B are cross sectional views of a mold apparatus at the beginning and end of a process for compressing and introducing indentations in a flat pack.

FIGS. 9A and 9B are cross sectional views of another mold apparatus at the beginning and end of a process for compressing and introducing indentations in a flat pack.

DETAILED DESCRIPTION OF THE PREFERRED EMBODIMENTS

Figure 1:
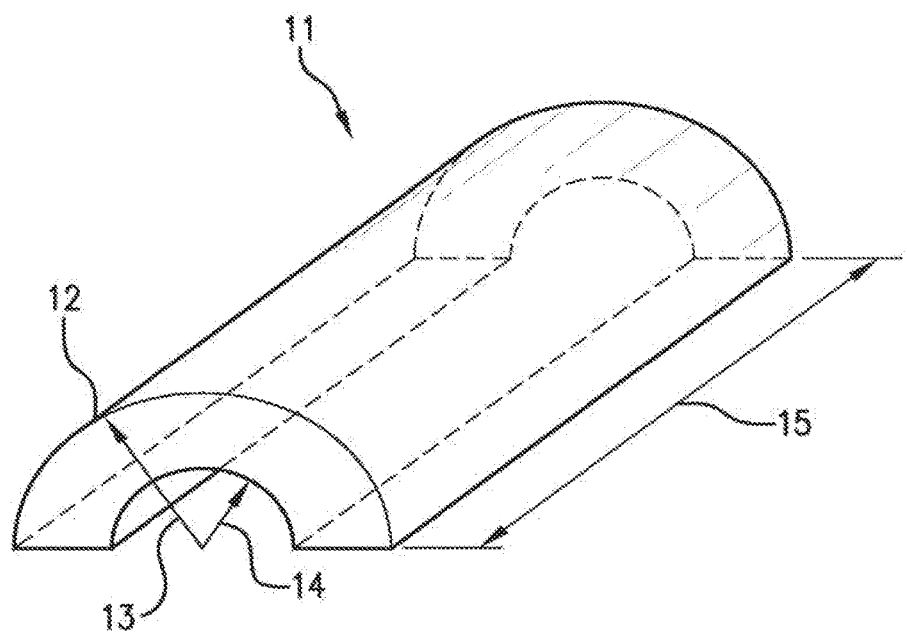
FIG. 1 illustrates one embodiment of a sealed container useful in the context of the invention.

The above and other features of the invention including various details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

The invention generally relates to insulated pipe arrangements, e.g., pipe-in-pipe or other assemblies or systems, suitable for transporting a fluid wherein the fluid is or could be at a different temperature than the surrounding environment. Many of the insulated pipes described herein are particularly useful in transporting hydrocarbons (e.g. crude oil and natural gas) from the point of extraction to storage or processing facilities, as well as for transporting liquefied natural gas from point-to-point.

For the purposes of this application, the term "fluid(s)" includes gases and/or liquids as well as supercritical fluids. As used herein, the terms "assembly" or "system" include any suitable length of insulated pipe. For instance, the terms can refer to the full length of a pipe-in-pipe used for its intended purpose. The terms also can refer to segments that can be joined together to form longer insulated piping, e.g., pipe-in-pipes.

Among the insulated pipe arrangements disclosed herein, insulated pipe-in-pipe assemblies include an inner pipe, an outer pipe, and an insulating material between an outer surface of the inner pipe and an inner surface of the outer pipe. Pipe-in-pipe assemblies can include one or more additional pipe(s) that can be arranged within the space defined by the inner surface of the inner pipe and/or in the exterior region surrounding the outer surface of the outer pipe. Optionally, the same or a different insulating material can be employed between the inner and/or outer pipe(s) and the additional pipe(s). It is also possible to employ a single pipe lined with an insulating material.

In specific aspects, the present invention relates to the pipe-in-pipe assemblies and methods of preparing them described in U.S. Patent Application Publication No. 2006/0272727 A1, titled Insulated Pipe and Method for Preparing Same, to Dinon et al., published on Dec. 7, 2006, the teachings of which are incorporated herein by reference in their entirety.

As described in U.S. Patent Application Publication No. 2006/0272727 A1, an insulated pipe-in-pipe assembly comprises: (a) at least one inner pipe with an exterior surface, (b) an outer pipe with an interior surface that is disposed around the at least one inner pipe, (c) an annular space between the interior surface of the outer pipe and the exterior surface of the at least one inner pipe, (d) a porous, resilient, compressible material disposed in the annular space, and (e) a remnant of a container that previously was positioned in the annular space and previously held the compressible material in a volume less than the volume of the compressible material in the annular space.

In another embodiment, an insulated pipe-in-pipe assembly comprises: (a) at least one inner pipe with an exterior surface, (b) a first outer pipe or other restraining means with an interior surface that is disposed around the at least one inner pipe, (c) an annular space between the interior surface of the outer pipe and the exterior surface of the at least one inner pipe, (d) at least one additional outer pipe that is positioned around the first outer pipe so as to create an additional annular surface between the exterior surface of the first outer pipe and the interior surface of an additional outer pipe (e) a porous, resilient, compressible material disposed in one or more of the annular spaces, and (f) a remnant of a container that previously was positioned in one or more of the annular spaces and previously held the compressible material in a volume less than the volume of the compressible material in the annular space(s).

In a further embodiment, an insulated pipe-in-pipe assembly comprises (a) at least one inner pipe with an exterior surface, (b) an outer pipe with an interior surface that is disposed around the at least one inner pipe, (c) an annular space between the interior surface of the outer pipe and the exterior surface of the at least one inner pipe, and (d) nanoporous silica disposed in the annular space, wherein the nanoporous silica has a density between 80 kg/m·sup.3 and about 140 kg/m·sup.3 and a thermal conductivity of about 20 mW/mK or less when measured between a surface at about 0.degree. C. and a surface at about 25.degree. C.

As also described in U.S. Patent Application Publication No. 2006/0272727 A1, a method of preparing an insulated pipe-in-pipe assembly comprises: (i) providing an assembly comprising (a) at least one inner pipe, (b) an outer pipe that is positioned around the at least one inner pipe so as to create an annular space between the exterior surface of the at least one inner pipe and the interior surface of the outer pipe, and (c) at least one container comprising porous, resilient, volumetrically compressible material, wherein the compressible material is restrained within the container and has a first volume, wherein the first volume of the compressible material is less than the unrestrained volume of the compressible material, and wherein the at least one container is disposed in the annular space, and (ii) altering the at least one container to reduce the level of restraint on the compressible material to increase the volume of the compressible material to a second volume that is greater than the first volume, thereby forming an insulated pipe-in-pipe assembly.

In another embodiment, an insulated pipe-in-pipe assembly is prepared by a method comprising: (i) providing an assembly comprising (a) at least one inner pipe, (b) a first outer pipe (or other restraining means) that is positioned around the at least one inner pipe so as to create an annular space between the exterior surface of the at least one inner pipe and the interior surface of the outer pipe, (c) optionally, at least one additional outer pipe that is positioned around the first outer pipe so as to create an annular space between the exterior surface of the first outer pipe and the interior surface of the additional outer pipe, and (d) at least one container comprising porous, resilient, volumetrically compressible material, wherein the compressible material is restrained within the container and has a first volume, wherein the first volume of the compressible material is less than the unrestrained volume of the compressible material, and wherein the at least one container is disposed in (at least one of) the annular space(s), and (ii) altering the at least one container to reduce the level of restraint on the compressible material to increase the volume of the compressible material to a second volume that is greater than the first volume, thereby forming an insulated pipe-in-pipe-in-pipe assembly.

The inner pipe, outer pipe and any additional pipe(s) employed in pipe-in-pipe assemblies or systems can have any suitable length. The choice of length depends, at least in part, on constraints imposed by manufacturing techniques and/or transportation methods. As known in the art, pipe segments can be joined together, e.g., by welding or other suitable techniques, to form longer piping.

Pipe diameters can be selected according to the application and can be the same or can vary along the length of the pipe.

The inner pipe(s) can be disposed in any suitable arrangement within the outer pipe, and both the inner pipe(s) and the outer pipe can have any suitable cross-sectional shape. In most cases, the pipes have a circular cross section but can also have flattened, oval, irregular or other shapes. If the pipe-in-pipe arrangement comprises a single inner pipe, the inner pipe can be disposed concentrically, can be asymmetrically disposed, or free to assume any disposition within the diameter of the outer pipe.

If the pipe-in-pipe apparatus comprises a plurality of inner pipes, an inner pipe can be placed within the next outer pipe in any suitable position. In other embodiments, an outer pipe can form a conduit for a bundle of pipes adjacent to one another. Wires, cables or other devices useful in carrying out fluid transport may also be present, e.g., they are disposed in the outer pipe.

The inner pipe(s) and outer pipe(s) can be made of any suitable material and can be made of the same or different material(s). For use in underwater oil and gas transport, the pipes are typically made of metal or metal alloys, especially carbon steel, Ni-Steel or stainless steel. In other embodiments, non-metallic materials are also suitable. Non-limiting examples of suitable pipe materials include fiberglass, elastomers, thermoset polymers, thermoplastic polymers, and composites (e.g., fiber-reinforced polymers).

In some embodiments, the outer pipe(s) comprise(s) a flexible material capable of undergoing elastic deformation upon application of pressure. The pressure can be applied to the outer surface of the outer pipe, such as when the pipe-in-pipe apparatus is submerged under water. The pressure also can be applied to the inner surface of the outer pipe, for example, when a compressible insulating material expands against the outer pipe from within the annular space of the pipe-in-pipe apparatus.

The inner pipe(s) also can comprise a flexible material. When both inner pipe(s) and outer pipe comprise flexible materials, the pipe-in-pipe assembly will itself be flexible. Flexible pipe-in-pipe assemblies can be easily deployed, coiled and/or can be fitted in nonlinear layouts such as found in industrial plants and other applications.

The wall thicknesses of the inner pipe, outer pipe and any additional pipe(s) can be of any suitable value and typically will be chosen to provide sufficient strength during operation. Inner pipes(s) typically have a wall thickness providing sufficient strength to contain the pressure generated by the flow of fluid, whether liquid or gas, which can be as high as 140 MPa. (20,000 psi). The outer pipe can have any strength, e.g., wall thickness, for the intended application. For example, in some deep-sea applications, the outer pipe can have a wall thickness sufficient to substantially resist pipe deformation while under high water pressure. In shallow underwater applications, or for use at atmospheric pressure (e.g., on dry land), the wall thickness of the outer pipe can be relatively thin.

Thinner inner and/or outer pipes can be employed in conjunction with insulating materials that provides at least partial mechanical support of the inner and/or outer pipe.

In yet other applications, the outer pipe can be elastic, in which case the wall thickness depends on the particular material or materials used in fabricating the outer pipe and on the pressures to which the outer pipe is subjected.

An outer pipe has an interior surface that is positioned around an inner pipe(s) having an exterior surface(s). Alternatively, an inner pipe has an exterior surface that is positioned within an outer pipe having an interior surface. The void or gap space between the exterior surface of an inner pipe and the interior surface of the outer pipe, or the exterior surface of the outer pipe and the interior surface of an additional outer pipe, is defined herein as the "annular" space. In many arrangements, the annular space has a ring-like shape. The annular space also can have other shapes and, as used herein, the term "annular" refers to concentric, off-center, irregular spaces or spaces having other geometries.

The annular space can be under vacuum or can contain a gas at a suitable gas pressure. In some embodiments, the pressure in the annular space changes during the manufacturing process. Typically, the gas pressure within the annular space is at atmospheric pressure during and/or after fabricating the assembly. In some examples, the pressure is reduced during manufacture and can be below atmospheric once the preparation of the assembly is completed. In others, the pressure during and/or after manufacture is less than atmospheric. Pressures higher than atmospheric also can be present.

Typically, the annular space contains air. Other suitable gases can be employed. In some embodiments, for instance, the gas has a lower thermal conductivity than air. Examples of such gases include argon, krypton, carbon dioxide, hydrochlorocarbons, hydrofluorocarbons, hydrochlorofluorocarbons, perfluorohydrocarbons, ethane, propane, butane, pentane, and mixtures thereof.

The insulated pipe systems described herein include an insulated material. For example, in pipe-in-pipe assemblies the insulated material is present in at least one annular space. In some aspects of the invention, the insulating material is held in a container, also referred to herein as a pack.

In some implementations, the insulating material reduces transfer of thermal energy between the inner pipe(s) and the surrounding environment (e.g., thermally insulation). The material employed preferably has a thermal conductivity of about 20 (mW)/m·K or less (e.g., about 12 (mW)/m·K to about 20 (mW)/m·K) when measured between a surface at about 0° C. and a surface at about 25° C. The thermal conductivity can be measured, for example, in accordance with ASTM C518.

In other implementations, the insulating material reduces transfer of other types of energy, for example acoustic energy between the inner pipe(s) and the surrounding environment.

In specific aspects of the invention, the insulating material is porous, for instance microporous or nanoporous. As used herein, the term "microporous" refers to materials having pores that are about 1 micron and larger; the term "nanoporous" refers to materials having pores that are smaller than about 1 micron, preferably less than about 0.1 microns. Pore size can be determined by methods known in the art, such as mercury intrusion porosimetry, or microscopy. In some examples the pores have an average pore size (e.g., average pore diameter) of about 25 microns or less (e.g., about 15 microns or less; or about 10 microns or less; or even about 1 micron or less). Preferably the pores are interconnected giving rise to open type porosity.

The microporous or nanoporous material can be an oxide of a metal, such as, for instance, silicon, aluminum, zirconium, titanium, hafnium, vanadium, yttrium and others, and/or mixtures thereof.

Insulating materials that are particularly preferred include aerogels and/or xerogels.

Aerogels are low density porous solids that have a gas rather than a liquid as a dispersant. Generally, they are produced by removing pore liquid from a wet gel. However, the drying process can be complicated by capillary forces in the gel pores, which can give rise to gel shrinkage or densification. In one manufacturing approach, collapse of the three dimensional structure is be essentially eliminated by using supercritical drying. A wet gel also can be dried using an ambient pressure, also referred to as non-supercritical drying process. When applied, for instance, to a silica-based wet get, surface modification, e.g., end-capping, carried out prior to drying, prevents permanent shrinkage in the dried product. The gel still shrinks during drying but springs back recovering its former porosity.

Product referred to as "xerogel" also is obtained from wet gels from which the liquid has been removed. The term often designates a dry gel compressed by capillary forces during drying, characterized by permanent changes and collapse of the solid network.

For convenience, the term "aerogel" is used herein in a general sense, referring to both "aerogels" and "xerogels".

Aerogels typically have low bulk densities (about 0.15 g/cm$^3$ or less, preferably about 0.03 to 0.3 g/cm$^3$), very high surface areas (generally from about 300 to about 1,000 square meter per gram (m$^2$/g) and higher, preferably from about 600 to about 1000 m$^2$/g), high porosity (about 90% and greater, preferably greater than about 95%), and a relatively large pore volume (about 3 milliliter per grain (mL/g), preferably about 3.5 mL/g and higher). Aerogels can have a nanoporous structure with pores smaller than 1 micron (μm). Often, aerogels have a mean pore diameter of about 20 nanometers (nm). The combination of these properties in an amorphous structure gives the lowest thermal conductivity values (e.g., 9 to 16 (mW)/m·K at a mean temperature of 37° C. and 1 atmosphere of pressure) for any coherent solid material. Aerogels can be nearly transparent or translucent, scattering blue light, or can be opaque.

A common type of aerogel is silica-based. Aerogels based on oxides of metals other than silicon, e.g., aluminum, zirconium, titanium, hafnium, vanadium, yttrium and others, or mixtures thereof can be utilized as well.

Also known are organic aerogels, e.g., resorcinol or melamine combined with formaldehyde, dendredic polymers, and so forth, and the invention also could be practiced using these materials.

In specific aspects of the invention, the aerogel material employed is hydrophobic. As used herein, the terms "hydrophobic" and "hydrophobized" refer to partially as well as to completely hydrophobized aerogel. The hydrophobicity of a partially hydrophobized aerogel can be further increased. In completely hydrophobized aerogels, a maximum degree of coverage is reached and essentially all chemically attainable groups are modified.

Hydrophobicity can be determined by methods known in the art, such as, for example, contact angle measurements or by methanol (MeOH) wettability. A discussion of hydrophobicity in relation to aerogels is found in U.S. Pat. No. 6,709,600 B2 issued to Hrubesh et al. on Mar. 23, 2004, the teachings of which are incorporated herein by reference in their entirety.

Hydrophobic aerogels can be produced by using hydrophobizing agents, e.g., silylating agents, halogen- and in particular fluorine-containing compounds such as fluorine-containing alkoxysilanes or alkoxysiloxanes, e.g., trifluoropropyltrimethoxysilane (TFPTMOS), and other hydrophobizing compounds known in the art. Hydrophobizing agents can be used during the formation of aerogels and/or in subsequent processing steps, e.g., surface treatment.

Silylating compounds such as, for instance, silanes, halosilanes, haloalkysilanes, alkoxysilanes, alkoxyalkylsilanes, alkoxyhalosilanes, disiloxanes, disilazanes and others are preferred. Examples of suitable silylating agents include, but are not limited to diethyldichlorosilane, allylmethyldichlorosilane, ethylphenyldichlorosilane, phenylethyldiethoxysilane, trimethylalkoxysilanes, e.g., trimethylbutoxysilane, 3,3,3-trifluoropropylmethyldichlorosilane, symdiphenyltetramethyldisiloxane, trivinyltrimethylcyclotrisiloxane, hexaethyldisiloxane, pentylmethyldichlorosilane, divinyldipropoxysilane, vinyldimethylchlorosilane, vinylmethyldichlorosilane, vinyldimethylmethoxysilane, trimethylchlorosilane, hexamethyldisiloxane, hexenylmethyldichlorosilane, hexenyldimethylchlorosilane, dimethylchlorosilane, dimethyldichorosilane, mercaptopropylmethyldimethoxysilane, bis{3-(triethoxysilyl)propyl}tetrasulfide, hexamethyldisilazane and combinations thereof.

The porous material can include one or more additives, such as fibers, opacifiers, color pigments, dyes and mixtures thereof. For instance, a nanoporous material which is a silica aerogel can contain additives such fibers and/or one or more metals or compounds thereof. Specific examples include aluminum, tin, titanium, zirconium or other non-siliceous metals, and oxides thereof.

The porous material can be produced in granular, pellet, bead, powder, or other particulate form and in any particle size suitable for an intended application. For instance, the particles can be within the range of from about 0.01 microns to about 10.0 millimeters (mm) and preferably have a mean particle size in the range of 0.3 to 3.0 mm.

The insulating material also can be produced in a monolithic shape, for instance as a rigid, semi-rigid or flexible structure.

Insulated pipe arrangements, e.g., pipe-in-pipe assemblies can employ mat-shaped composites that include fibers. In a specific example, the invention is used to produce cracked monoliths, as described in U.S. Pat. No. 5,789,075, issued on Aug. 4, 1998 to Frank et al., the teachings of which are incorporated herein by reference in their entirety. Preferably, the cracks enclose aerogel fragments that are connected by fibers. Aerogel fragments can have an average volume of 0.001 mm$^3$ to 1 cm$^3$. In one composite, the aerogel fragments have an average volume of 0.1 mm$^3$ to 30 mm$^3$.

In other examples, the insulated pipe arrangements disclosed herein can use aerogel sheets or blankets produced from wet gel structures as described in U.S. Patent Application Publication Nos. 2005/0046086 A1, published Mar. 3, 2005, and 2005/0167891 A1, published on Aug. 4, 2005, both to Lee et al., the teachings of which are incorporated herein by reference in their entirety.

The arrangements, e.g., pipe-in-pipe systems, can utilize composite materials, for instance a composite that includes aerogel material, a binder and at least one fiber material as described, for instance, in U.S. Pat. No. 6,887,563, issued on May 3, 2005 to Frank et al., the teachings of which are incorporated herein by reference in their entirety.

Other specific examples of aerogel-based materials that can be used are fiber-web/aerogel composites that include bicomponent fibers as disclosed in U.S. Pat. No. 5,786,059 issued on Jul. 28, 1998 to Frank et al., the teachings of which are incorporated herein by reference in their entirety. Such composites use at least one layer of fiber web and aerogel particles, wherein the fiber web comprises at least one bicomponent fiber material, the bicomponent fiber material having lower and higher melting regions and the fibers of the web being bonded not only to the aerogel particles but also to each other by the lower melting regions of the fiber material. In some applications, the bicomponent fibers are manufactured fibers which are composed of two firmly interconnected polymers of different chemical and/or physical constructions and which have regions having different melting points, i.e. lower and higher melting regions.

As described in the above-referenced patent, the bicomponent fibers can have a core-sheath structure. The core of the fiber is a polymer, preferably a thermoplastic polymer, whose melting point is higher than that of the thermoplastic polymer which forms the sheath. The bicomponent fibers are preferably polyester/copolyester bicomponent fibers. It is also possible to use bicomponent fiber variations composed of polyester/polyolefin, polyester/polyethylene, or polyester/copolyolefin or bicomponent fibers having an elastic sheath polymer. Side-by-side bicomponent fibers also can be employed.

The fiber web may further comprise at least one simple fiber mate a which becomes bonded to the lower melting regions of the bicomponent fibers in the course of thermal consolidation. The simple fibers are organic polymer fibers, for example polyester, polyolefin and/or polyamide fibers, preferably polyester fibers. The fibers can be round, trilobal, pentalobal, octalobal, ribbony, like a Christmas tree, dumbbell-shaped or otherwise star-shaped in cross section. It is similarly possible to use hollow fibers. The melting point of these simple fibers should be above that of the lower melting regions of the bicomponent fibers.

In some aspects of the invention, the insulating material preferably is volumetrically compressible. Also preferred are resilient insulating materials. By resilient it is meant that the compressible material will have an elastic compressibility, wherein application of a pressure to a bulk amount of the compressible material will result in a reduction of the volume occupied by the compressible material, and wherein after release of the pressure the volume of the compressible material will increase and desirably return to substantially the same value as before application of the pressure.

In specific embodiments, the insulating material includes porous particles that are volumetrically compressible and resilient. The amount of volumetrically compressible and resilient porous particles present in the insulating material can vary from 0% to 100%. In preferred examples, the insulating material will comprise at least some porous particles (e.g., about 5% or more) and can consist essentially of, or even consist of, porous particles (e.g., about 100%).

Particles of materials such as described above and in particular nanoporous particles are preferred. Non-limiting examples of nanoporous silica particles include silica aerogels made by a sol-gel process, nanoporous silica made by a co-fuming process, and nanoporous silica made by co-fuming silica with carbon black followed by pyrolysis of the carbon. Desirably the porous particles are aerogel particles.

A suitable porous, resilient, volumetrically compressible insulative material such as for instance, aerogel and in particular Nanogel® aerogel (available from Cabot Corporation, Boston, Mass.) has spring-like properties and consequently there can be residual force in the material that acts on both the inner and outer pipes, especially where the unrestrained insulating material substantially fills (or even overfills) the annular space. This residual force is similar to the force a spring exerts when under compression, except in the case of the material the force may be bi- or tri- or even omni-directional instead of unidirectional. This residual force enables the insulation material to form a mechanical "bond" (through friction) between the inner pipe(s) and an outer pipe or between outer pipe(s).

The strength of this bond can depend, for example, upon the amount of material in the annular space, the nature of the material and the pipe material. In other words, the higher the percentage of annular space filled with the compressed material, the greater the packing of the unrestrained material and consequently, the stronger the "bond".

This "bond", in turn, transfers longitudinal and/or radial stresses that the pipe-in-pipe assembly faces in both installation (e.g., bending around a reel in a so called "reel-lay" case, bending as the assembly lays on the ocean floor in a so called "J-lay" case, bending off the back of the lay barge in a so called "S-lay" case) as well as in service (e.g., expansion and contraction of the inner pipe during heat up and cool down cycles). In the absence of a "bonded" insulation system such as this, the longitudinal stresses are typically handled by bulkheads which hold the inner and outer pipes together and the radial stresses are sometimes handled by centralizers (also known as spacers), which keep the pipes more or less concentrically aligned.

Non-particulate insulating materials also can be employed. Preferably, the non-particulate material used is resilient and volumetrically compressible. Non-limiting examples of non-particulate resilient, volumetrically compressible material include foams, materials comprising fibers, and composites thereof.

Non-limiting examples of compressible materials comprising fibers include composite materials comprising fibers and aerogels (e.g., fiber-reinforced aerogels) and, optionally, at least one binder. The fibers can have any suitable structure. For example, the fibers can have no structure (e.g., unassociated fibers). The fibers can have a matrix structure or similar mat-like structure which can be patterned or irregular and random. Preferred composites of materials comprising fibers include composites formed from aerogels and fibers wherein the fibers have the form of a lofty fibrous structure, batting or a form resembling a steel wool pad. The lofty fibrous structure is characterized in that upon application of a pressure, the volume of the lofty fibrous structure will be reduced, and upon removal of the pressure, the lofty fibrous structure will rebound to a volume at least greater than the volume when under pressure and desirably to the initial unrestrained volume. Examples of materials suitable for use in the preparation of the lofty fibrous structure include fiberglass, organic polymeric fibers, silica fibers, quartz fibers, organic resin-based fibers, carbon fibers, and the like. Although the material having a lofty fibrous structure is suitable for use in the inventive method by itself preferably the material having a lofty fibrous structure further comprises a second, open-cell material. A preferred example of an open-cell material for use in the inventive method is an aerogel. When a second, open-cell material (e.g., a silica aerogel) is used with a material having a lofty fibrous structure, the resulting composite material desirably is compressible and resilient. A preferred non-particulate porous, resilient, volumetrically compressible material comprises a blanket comprising a material having a lofty fibrous structure and a silica aerogel dispersed within.

Combinations of materials also can be employed. For example, insulating materials that are resilient and volumetrically compressible can be formed by combining compressible porous particles such as described above with non-porous materials that have only average or even modest compressibility.

The insulating material can include additives. Opacifiers, for instance, are used to prevent or minimize infrared transmission of thermal energy between the inner pipe and the outer pipe by absorption of the infrared waves. Non-limiting examples of suitable opacifiers include carbon black, titanium dioxide, zirconium silicate, and mixtures thereof. The amount of opacifier employed depends on the specific application.

Even though levels of stress transfer of preferred insulating materials disclosed herein may be low when compared to other materials (e.g., metals, composites) typically used in bulkhead and spacer construction, since the insulation material can completely fill all the annular space, the force transfer can be shared across the entire surface area of the pipe, rather than in relatively narrow slivers spaced relatively widely apart.

In some embodiments, the insulation provides one or more of longitudinal or radial load transfer between the inner pipe and the outer pipe and, preferably, the insulation is not adhesively bonded to the inner pipe or the outer pipe.

Optionally, pipe and pipe assemblies include additional insulators. Insulating gases, conventional gels, high viscosity fluids, and many other materials or combinations of materials can be employed.

Additional insulators can be disposed in the same annular space as that occupied by the compressible and resilient insulating material or in a separate annular space.

In specific implementations, the additional insulator is positioned to that between the interior surface of the outer pipe and the container(s) or between the exterior surface of the inner pipe(s) and the container(s). The additional insulator can be arranged so that any edges are staggered with respect to the edges of the container(s) so as not to provide energy transfer passages between the inner pipe(s) and the outer pipe. Additional insulator can be incorporated into the container or the container can be made out of the insulating material.

In some cases, the additional insulator comprises a compressible material. Preferably, the additional insulating material can comprise one or more blankets comprising a non-particulate porous, resilient, volumetrically compressible material.

The additional insulator also can comprise a metallic or metallized film. The metallic or metallized film serves to reduce transmission of energy between the inner pipe(s) and the outer pipe through radiation. The metallic or metallized film can be any suitable such film. Examples of suitable metallic or metallized films include aluminum foil, aluminum-coated substrates including polymer films, fabrics, and the like. The metallic or metallized film can be a separate film, can be incorporated into an insulating blanket, or can be incorporated into the container(s) wherein the metallic or metallized film can reside on the exterior surface or the interior surface or the container(s). The metallic or metallized film can be fastened to any surface within the annulus using any suitable fastener as previously recited herein, or can be placed without any fastener (e.g., by wrapping any surface). The material comprising the container(s), of course, can be a metallic or metallized film as well.

In addition to comprising a metallic or metallized film, the additional insulator can comprise any suitable film. Non-limiting examples of suitable films include polymeric and/or woven films or fabrics. In this regard "film" refers to a thin sheet of insulating material (e.g., films formed of high density polyethylene fibers such as TYVEK® material), which sheet can have any suitable configuration and which can comprise one or more layers of the same or different material. The film also can comprise a composite comprising a permeable membrane sandwiched between an inner and outer layer (e.g., GORE-TEX® material or other polytetrafluoroethylene material). The film can be fastened or incorporated into the pipe-in-pipe apparatus in any suitable manner, e.g., as previously recited herein for the metallic or metallized film.

In preferred pipe-in pipe arrangements the insulating material, e.g., particulate aerogel, is provided in one or more container(s) or pack(s) disposed in at least one annular space.

In addition to the insulating material, the container can include any suitable gas or can be under vacuum. Typically, the gas is air. In some embodiments the gas is a gas having a lower thermal conductivity than air. Examples of such gases include argon, krypton, carbon dioxide, hydrochlorocarbons, hydrofluorocarbons, hydrochlorofluorocarbons, perfluorohydrocarbons, ethane, propane, butane, pentane, and mixtures thereof.

The container can be manufactured to contain an insulating material such as described above in a compressed state and to allow the material to expand upon alteration of the container, e.g., relaxation of forces restraining the container, as described in U.S. Patent Application Publication No. 2006/272727 A1, titled Insulated Pipe and Method for Preparing Same, to Dinon et al. published on Dec. 7, 2006, the teachings of which are incorporated herein by reference in their entirety.

Manufacturing techniques suitable for preparing an insulating element, i.e., a container or pack, can employ filling equipment for adding granular material to a casing, e.g., a bag made of a polymeric material, such as, for instance, polyethylene, nylon or other materials. Vertical filling machines can be used in combination with a suitable support, e.g., panels, scaffoldings crates, designed to secure the casing, e.g., bag, during the filling process. Preferred arrangements secure the casing in a vertical position, opening on top. To form a flat pack, for instance, the casing can be secured between two fixed vertical panels, positioned at a distance suitable for obtaining a desired pack thickness. Suction or other suitable approaches can be employed to open the casing and/or hold it open during filling.

To enhance packing, the filling process can be carried out while the casing is subjected to vibrations.

Once filled to the top, the casing can be sealed using a suitable technique, such as, for example, adhesion, heat sealing, and stitching. In some embodiments a vacuum, e.g., slight vacuum, is applied, e.g., through a one way valve, to remove inter-particle gas, thereby hardening the pack into a rigid shape. In preferred examples, the container is compressed enough so that it retains its shape during handling and transportation.

Molding techniques can be employed to shape the pack in a desired configuration. For instance, once filled and sealed, a container can be pressed in a suitable mold while applying a vacuum, e.g., through a one way valve provided in the casing.

There are no restrictions on the configuration of the container and containers can have any suitable shape. For instance, a container can have a roughly rectangular parallelepiped geometry a brick shape).

In some aspects of the invention, a compressed container or compressed pack is enveloped by a second casing, sleeve or sheath. This sheath can be attached to the container by mechanical means, e.g., rivets, posts, clamps and other suitable mechanical means. Glues or adhesives also can be employed. Other attachment techniques include welding, e.g., induction welding, ultrasonic welding and so forth. In a pipe-in-pipe arrangement, the second casing or sheath can be attached to the pipe using a suitable attachment device.

In specific implementations, a flat container or insert, e.g., a cracked monolith, a blanket, sheet, a composite material such as described above or a granular material held in a casing can be rolled around a pipe and secured in a suitable manner, e.g., using snaps, tabs, straps, ties and so forth.

A container also can have a spherical or cylindrical shape. In a preferred embodiment, the container(s) has (have) an elongate arched shape. It will be understood that an elongate arched shape comprises a curve having generally a circular geometry defined by a cross section of the elongate arched container, wherein the angle defined by the two ends of the arch and the central point of the thus-defined semi-circle can be any nonzero value between zero and, at the limit, 360 degrees a circular elongate arched container is also contemplated). Thus, in one embodiment, the arch of the elongate arched container comprises an angle as hereinbefore defined of 180 degrees (e.g., a "half shell"). In another embodiment, the arch of the elongate arched container comprises an angle of less than 360 degrees (e.g., about 355 degrees or less), in which the elongate arched container generally comprises a "C" shape, wherein the container has non-contiguous elongate edges that define a gap therebetween.

The container(s) can also have shaped elongate edges to facilitate "mating" of the edges. For example, a pair of elongate mating edges can have complementary shapes so that the mating geometry can be any suitable mating geometry, including simple parallel faces. The mating edges can have a "tongue-in-groove" configuration and variations thereof. Other suitable geometries will be readily apparent to the ordinarily skilled artisan.

FIG. 1 illustrates an embodiment of a container having an elongate arched shape. Shown in FIG. 1 is container 11, with an outer radius 13, inner radius 14, and length 15. Container 11 includes insulating material surrounded by casing 12, which preferably is flexible.

In one embodiment, the casing material is flexible but substantially non-elastic. In other embodiments, the material can be elastic to allow for expansion of the compressible material while maintaining its integrity.

Casing 12 can be a permeable, semipermeable or impermeable to air. Preferred air-impermeable materials are chosen to have sufficient air-impermeability to maintain a reduced air pressure for at least several months (e.g., at least 3 months) and to possess sufficient mechanical durability to allow for handling without accidental breaching as may occur, for example, during shipping and handling, or during installation within the pipe-in-pipe assembly. In specific examples the air-impermeable material comprises a metal film or a polymer-based film, e.g., a polymer or copolymer (e.g., coextruded nylon polyethylene) film, a natural or synthetic fabric, and combinations thereof.

Casing 12 has dimensions suitable to the application. For instance it can be is dimensioned to fully enclose the compressible material under restraint. In other examples, casing 12 can be dimensioned so as to fully enclose the compressible material under less restraint or even at its unrestrained volume. After compression of the compressible material, the excess material can simply drape the container(s) in a random manner. The material can be provided with pleats, or folds, so that upon compression of the container(s), the material folds down to allow for a smoother outer surface than otherwise attainable without pleats or folds.

To form a sealed container, edgings or ends of casing 12 can be closed and in some embodiments sealed. Tape, tabs, and other devices also can be used.

The casing can comprise a single uniform material, or the container can be further equipped with at least one restraining or constraining means, wherein the restraining means maintains the compressible material in a compressed state. The restraining means can surround at least a portion of the container and may comprise, for example, at least one sheath or belt. The sheath(s) or belt(s) can comprise any suitable material, and can comprise the same or different material as the container(s). Optionally, the container can be sealed, e.g., with a gas impermeable seal, or otherwise.

In some embodiments, a compressed container is provided with a layer or sheath attached to the container at one and preferably more than one discrete locations. In contrast to attaching the container to all or to large area(s) of the sheath, attachment through localized points allows the container to fully expand when deployed and facilitates wrapping.

The container can be flat or can have a suitable preformed shape, for instance a shape such as shown in FIG. 1. The layer preferably is flexible and can be fabricated from metal film, thin metal sheet, or from a polymeric material. Attachment between the container and the layer can be by adhesion, e.g., using an adhesive or glue, or by other suitable means.

Preferably the layer is dimensioned and shaped to surround the container once the container is positioned in the pipe-in-pipe assembly and to allow for full expansion of the insulating material once restraining forces are removed.

Figure 2:
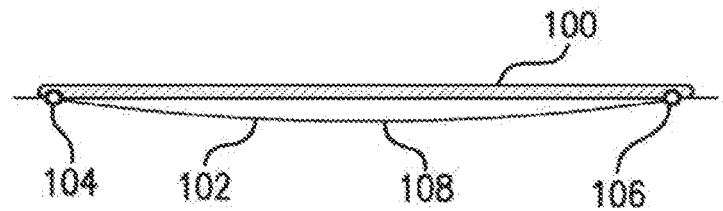
FIGS. 2, 3 and 4 are cross sectional views showing discrete point attachments of a constraining layer to one or two half shell containers.

Several examples are described below. Shown in FIG. 2, for instance, is compressed pack 100 attached to constraining layer 102 at points 104 and 106. Further attachment can be provided at mid point 108. The same or different means of attachment can be employed at point 104, 106 and optional point 108.

Points 104 and 106 are discrete regions of the container and/or constraining layer, e.g., strips, where the two structures are attached to one another, e.g., by adhesion, Velcro, and so forth. Thus in many cases, each of points 104 and 106 are less than the outer surface of container 100.

Figure 3:
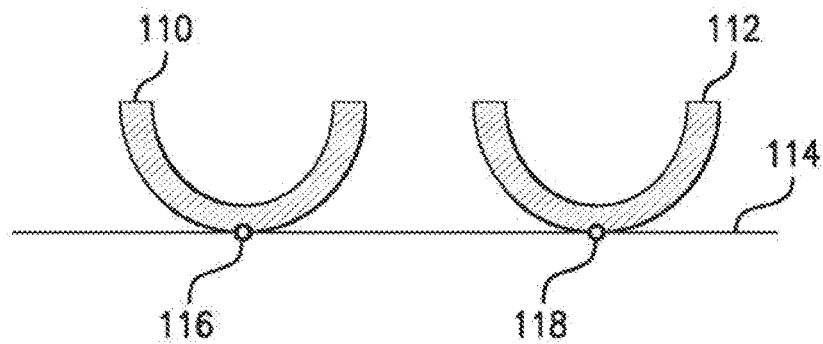

FIG. 3 illustrates an arrangement for affixing, adhering discrete points of half shell containers, such as the container in FIG. 1. Shown in FIG. 3 are half shell compressed containers 110 and 112 adhered to constraining layer 114 at points 116 and 118, essentially as described above.

Figure 4:
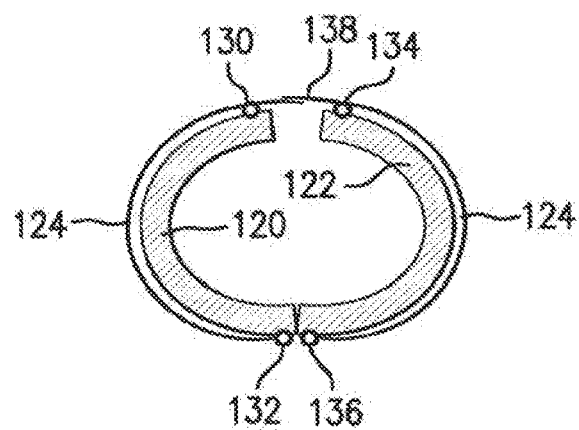

A further arrangement is shown in FIG. 4. Shown in FIG. 4 are compressed half shell containers 120 and 122 in their mounted configuration. As seen in FIG. 4 attachment of half shell container 120 to constraining layer 124 is at end points 130 and 132. Similarly, half shell container 122 is attached to constraining layer 124 at points 134 and 136. Constraining layer 124 can be closed around half shell containers 120 and 122 at closure 138.

With insulating materials that are monolithic or composite materials, the casing can be omitted. Originally flat, such materials, e.g., blankets, sheets, composites, cracked monoliths and the like can be rolled around a pipe and secured in a rolled-up configuration by any suitable means such as, snaps, straps ties, tabs or other attachments.

A sleeve can be provided to partially or completely encircle or enclose the container. The sleeve protects the container(s) from mechanical damage during manufacturing, installation and/or operation, can aid in positioning of the container during installation, can provide additional insulating properties to the pipe-in-pipe assembly, and/or can serve another purpose.

The sleeve can be made of any suitable material. In certain embodiments, the sleeve comprises an elastic material so as to accommodate the expansion of the container(s) after alteration without damage to the sleeve. The sleeve can also be enclosed by the container(s).

Figure 5:
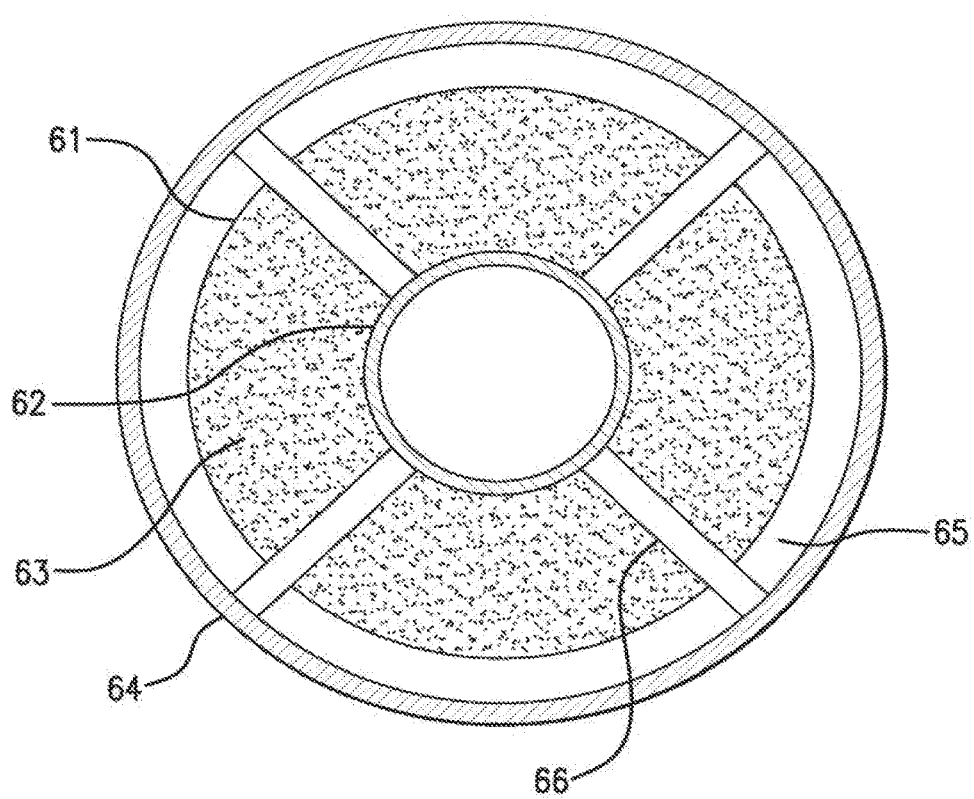
FIG. 5 illustrates a pipe in pipe assembly whereby a sleeve or sheath is used to constrain the porous, resilient and volumetrically compressible material such that a void space exists between the sleeve and the outer pipe.

In another embodiment, illustrated in FIG. 5, sleeve 61 functions as a restraint on the expansion of the compressed material 63, even upon alteration of a container. In this insulated assembly, it is preferred that there is a void in the annular space 65 between the exterior surface of sleeve 61 and the inner surface of the outer pipe 64. This annular void may be filled with a gas, such as air. The void space may be maintained through the use of bulkheads, or spacers (of various forms) 62. The presence of the void space allows the inner and outer pipes to move independently of each other, which may be advantageous in certain deployment methods or operating conditions.

In some embodiments, the size of the sleeve, e.g., second casing or sheath, is selected to dial in parameters characterizing the final pipe-in-pipe arrangement. Sleeves that are relatively large allow for greater expansion of insulating material upon breach of the container. Smaller sizes limit this expansion. For the same quantity of insulator, a larger second sheath or casing results in a lower filler density and the reverse is true for relatively tight second casings. Accordingly, simply selecting an appropriate second sheath size can control thermal insulation characteristics of the insulating layer in the pipe-in-pipe arrangement.

The container(s) can be provided with a heat shield(s). The function of the heat shield(s) is to protect the container(s) from heat generated by any welding process that may be employed during manufacturing, installation and/or operation. The heat shield(s) can be the same as the sleeve, or the heat shield(s) can be separate and distinct from the sleeve. The heat shield(s) can be made of any suitable material, for example, a metal or a thermally stable polymer. In some embodiments, the heat shield(s) is (are) separate from the container. In such embodiments, the heat shield(s) can be free-floating, or the heat shield(s) can be attached to the inner surface of the outer pipe or the outer surface of the inner pipe(s) of the pipe-in-pipe assembly, by any suitable means, such as by way of suitable fasteners or welding.

Non-limiting examples of fasteners include adhesive compositions, adhesive tapes, hook-and-eyelet assemblies, and hook-and-loop fasteners.

The container(s) can optionally have a coating comprising a lubricating agent. The lubricating agent serves to facilitate assembly of the pipe-in-pipe apparatus, e.g., by facilitating the positioning of the container(s) within the annular space.

Containers can be prepared by filling granular insulating material into a suitably shaped casing. Filling and/or packing can be enhanced by using vibration, tamping or both. Techniques and equipment that can be employed are described in U.S. Patent Application Nos. 20050074566 A1 and 20050072488 A1, both to Rouanet and published on Apr. 7, 2005 and International Publication Nos. WO 2005/032943 A2, and WO 2005/033432 A1, both published on Apr. 14, 2005. The teachings of these U.S. and PCT publications are incorporated herein by reference in their entirety.

Vertical filling machines and a single point suction also can be used. Side walls in a vertical filling machine can be pressed in or opened to form a container in a desired size.

Once the container is filled or, as described below, overfilled, the container can be sealed.

Figure 6:
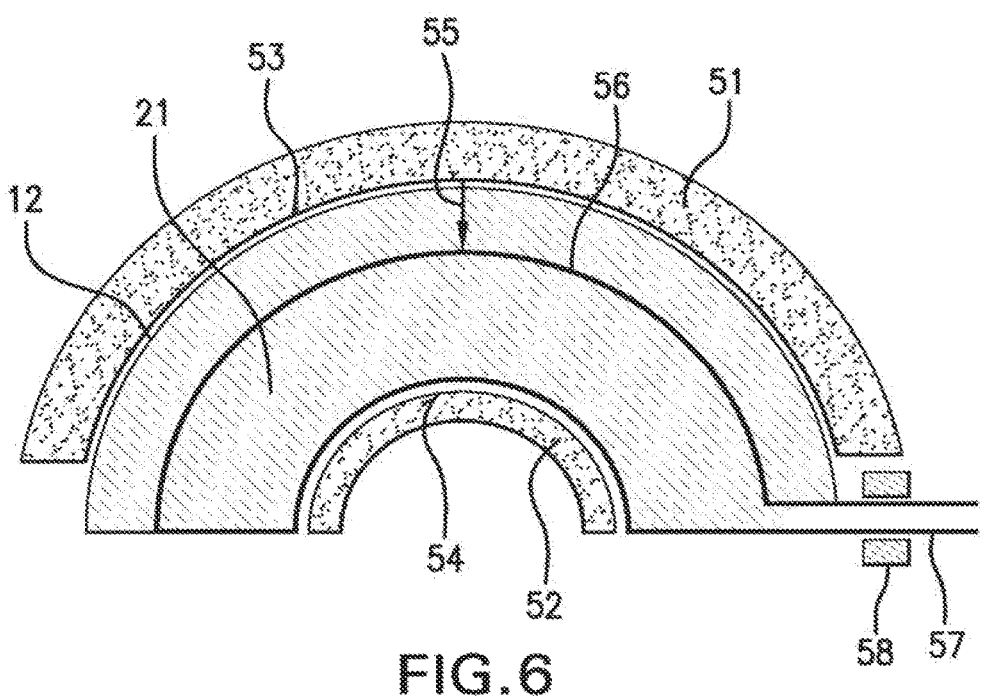
FIG. 6 is a schematic cross-sectional view of a mold apparatus at the beginning and end of a process of forming a sealed container useful in the context of the invention.

Shaped containers can be prepared by molding or other suitable techniques. One preferred process for preparing the elongate arched container embodiment depicted in FIG. 1 as a sealed container is illustrated by reference to FIG. 6. FIG. 6 schematically illustrates a cross-sectional view of a mold apparatus for forming a container comprising nanoporous silica particles. The mold apparatus comprises upper mold member 51 and lower mold member 52. As shown in FIG. 6, an unsealed container of an air-impermeable flexible material 12 with compressible material 21 therein is placed in contact with one surface 53 of the outer mold member 51 and one surface 54 of the inner mold member 52. The outer mold member is moved distance 55 so that surface 53 moves to position 56, while a vacuum is applied through a fluid connection 57. A sealing means 58 is then applied to fluid connection 57, and fluid connection 57 is sealed, either by leaving sealing means 58 in place, or by sealing the end of fluid connection 57 beyond sealing means 58, followed by removal of sealing means 58, to produce the elongate arched sealed container 11. In similar embodiments, outer mold member 51 may be held stationary while inner mold member 52 can be moved to a position closer to outer mold member 51, or both outer mold member 51 and inner mold member 52 can be moved simultaneously towards each other. Alternatively, neither inner mold member 52 nor outer mold member 51 are moved.

When the container(s) is (are) non-sealed (i.e., not airtight), the container can be prepared by any suitable method. Numerous methods for compression filling containers with a compressible material are well known in the art. In one embodiment, the process recited herein for preparing an elongate arched sealed container can be adapted for preparing the (non)sealed container by eliminating the application of the vacuum and by including at least one surrounding sheath or belt which is secured in the compressed position to retain the compressible material in a compressed state.

Specific aspects in shaping or manufacturing containers, preferably in compressed configuration, are described below.

a. Suction vacuum packing in a flexible container with mold using single or multiple point suction.

An airtight container is placed in a mold and connected to a vacuum pump and the pressure inside the container is reduced. Once the pressure inside at the container is at the desired level, the container is sealed and the connection removed. The pressure differential between the outside and the inside of the container compresses the material which is shaped by the mold.

b. Compression of a flexible container inside a rigid mold.

A container filled with particles is placed in a mold with rigid, but movable boundaries. The container is compressed using gas, liquid or other suitable compression means, into a desired shape and the container sealed airtight. The container is then removed from the mechanical compression mold.

c. Compression of a flexible container with flexible mold (e.g. a bladder).

A container filled with particles is placed in a mold with flexible boundaries. The container with particles is compressed into a desired shape by applying a pressure on the flexible boundaries. Gas, liquid or other suitable compression means may be used to apply pressure to the container. When the desired shape of the container has been produced, the container is sealed and removed from the mold.

d. Compression of flexible container with rigid and flexible mold.

Mechanical compression of containers uses a combination of processes (b) and (c) employing a mold that has both movable rigid boundaries a flexible boundaries.

e. Rigid mold compression of flexible container after vacuum packing.

A compressed container is produced via vacuum as described herein, then a rigid mold is used for a compression of the container into a desired shape.

f. Flexible compression of flexible container after vacuum packing.

A compressed container is produced via vacuum as described herein, then a flexible boundary mold (e.g. mold with bladders) is used to apply pressure to compress the container into the final shape.

g. Rigid and/or flexible mold mechanical compression of flexible container concurrent with vacuum packing.

A compressed container is produced using a vacuum as described herein, while simultaneously applying mechanical compression as outlined in process (b), (c) or (d) above.

h. Use of Rollers

In another embodiment, the container(s) can be compressed and/or shaped by passage of the container(s) through a system of driven rollers that compress the container(s) to desired dimensions. In the simplest case, the container(s) has a rectangular parallelepiped geometry (e.g., a brick shape). The container(s) is then passed between two parallel cylindrical rollers having a gap therebetween, wherein the gap is smaller than the thickness of the container(s), thereby compressing the container(s) to the desired thickness. The container(s) can be at atmospheric pressure or at a reduced pressure. Alternatively, the pressure within the container(s) can be reduced as the container(s) is passed between the rollers, so that after passage of the container(s) between the rollers, the container(s) is at a reduced pressure.

In other embodiments, multiple rollers can be configured to produce a shape in the container(s). For example, three pairs of rollers placed end-to-end and having an angle between adjacent pairs of rollers of 60.degree. can be used to shape the container(s) in a roughly semicircular shape. Other embodiments will be readily apparent to the skilled artisan.

i. High pressure chamber installation.

A compressed container is produced using vacuum processes described herein, (a) or (b), then containers are placed in a chamber where the pressure is then maintained above atmospheric pressure. The additional pressure will increase the level of compression of the packs.

j. Compression of semi-rigid container.

This method does not require a mold. A rigid container is filled with compressible material and a mechanical press is used to press the container into the desired shape. Once the container is in the desired shape a mechanical restraint or airtight seal is applied to lock the container into that shape.

In a vertical filling machine, compression can be effected using machine side walls or inserts that can be pressed inwardly, thereby compressing the container.

k. External air pressure compression of a semi-rigid container.

The container is filled with compressible material and the container is placed in a chamber vacuum. Once the chamber has been evacuated, the container is sealed with an airtight seal and the pressure in the chamber is raised to atmospheric. The pressure differential between in the inside and the outside of the container is used to compress the container. Alternatively, the filled container is connected to a vacuum, and the pressure in the container is reduced. Once the pressure is at the desired level the suction port is sealed.

Figure 7A:
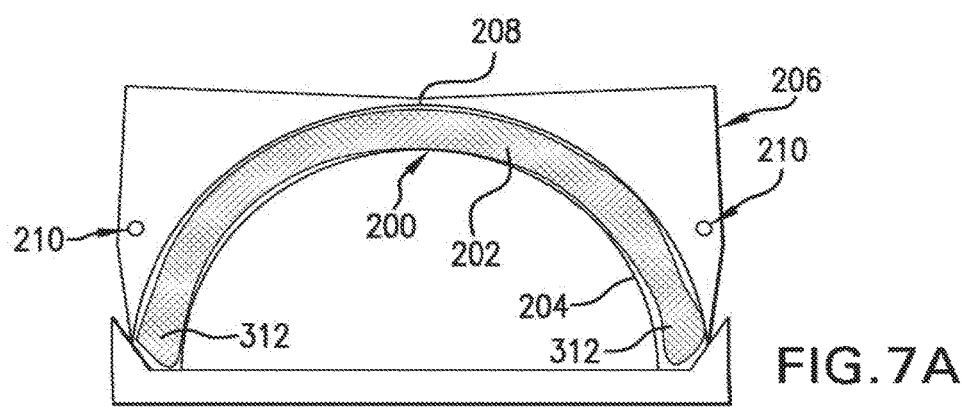
FIGS. 7A and 7B are cross-sectional diagrams illustrating one implementation of compressing a half shell container.
Figure 7B:
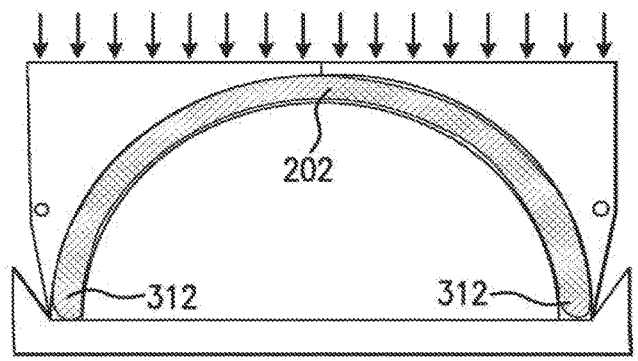

In a specific embodiment, the container is prepared by using a mold system that converts horizontal compression to radial compression. Shown in FIG. 7A is half shell container 200 in an uncompressed configuration in which insulating material 202 loosely fills casing 204. Container 200 is placed in mold 206 provided with hinge mechanism 208. Motion of the hinge mechanism is defined by guide pins 210 which can travel in slots machined into an end plate. In its uncompressed configuration the edges of container 200 are at their radially uncompressed position. A flat plate (not shown) can be employed to push on hinge mechanism 208 in the direction of the arrows, as seen in FIG. 7B. Guide pins 210 travel along the slots and the horizontal compression is converted to radial compression of the insulating material 202 as edges 212 of container 200 move from the initially relaxed position shown in FIG. 7A to the radially compressed position shown in FIG. 7B. Other arrangements can be employed.

Container 200 can be sealed by techniques such as described above.

Relative to containers molded to predefined shapes, e.g., a shape such as illustrated in FIG. 1, the ease and simplicity of manufacturing flat containers is very attractive. However, fitting flat containers within a curved space such as the annular space, as well as wrapping a flat container around an outer surface of the inner pipe or within an inner surface of the outer pipe can present problems. Manipulating flat containers during assembly becomes increasingly difficult with thick containers and with containers that are rigid or semi-rigid.

Accordingly, in one implementation, the invention relates to providing a flat container that can easily fit around curved surfaces, e.g., the inner surface of an outer pipe or the outer surface of an inner pipe. One technique for making containers that can be easily fitted in the annular space involves introducing indentations into a flat container enclosing granular insulation material.

Indentations can be made to any suitable depth. Preferably, indentations are made into but not through the container. For example, indentations can be provided at one face of a flat container, resulting in a surface that can expand with respect to most of the body of the container. Indentations also can be made deeper. For instance they can be cut through most of the thickness of the container or essentially to the interior surface of the material enclosing the container.

The notches can be continuous or perforation-like. They can be provided in uniform or non-uniform patterns. The notches can have a "V" shape or a "U" shape cross section, can be thin and straight, or can have another suitable shape.

Grooves or channels also can be formed, with each groove having a length and a cross section, e.g., a "V" shaped cross section. During installation the length of the notches preferably is oriented along the length of the pipe. The base, un-notched surface of the flat container can be positioned at the outer surface of the inner pipe, with the notched surface facing outwardly, e.g., towards the inner surface of the outer pipe.

Notches or indentations also can be formed at the opposite flat face of the container. In one embodiment, the flat pack can have pockets of insulating material the pockets being separated from one another at sealed boundaries in a "bubble wrap" configuration.

Preferred embodiments are directed to techniques that provide indentations while also compressing the insulating material in the container.

Shown in FIG. 8A is flat pack 250, positioned into mold 252 having die base 254 and die 256. Die 256 is provided with teeth 258 that are shaped and dimensioned to form a desired notch profile. All teeth 258 in die 256 can have the same shape. Alternatively some teeth can have one shape while others can have different shape(s). Preferably, teeth 258 do not cut through sheath 260 of container 250.

Dies can be provided with adjustments to accommodate flat packs having different thicknesses. For example, flat packs can be raised with respect to die base 254 using one or more inserts. Inserts also can be positioned above the top surface of pack 150 to prevent indentations from penetrating too deeply into container 250.

To compress the insulating material and form notches 262 in flat pack 250, die 256 is pressed down, as illustrated in FIG. 8B. As notches 262 are formed, the insulating material is forced into un-indented or un-notched regions 268.

In specific examples, notches 262 have a depth that is in a suitable range of from with respect to the thickness of flat pack 250 in its compressed configuration. For a V shaped profile, notch angles can be less than 90°, preferably less than 45°, for instance about 38°.

Die sections 264 separate one tooth from another and can have any desired length and/or profile. While die sections 264 in FIGS. 8A and 8B are somewhat curved or arched, FIG. 9A shows die 266 having straight or flat die sections 264; FIG. 9B is a cross-sectional view of compressed pack 270 obtained by using die 266 illustrated in FIG. 9A. Other profiles can be selected. Die sections between teeth also can be minimized and dies can be configured with the bases of teeth 258 touching one another.

The flat pack can be sealed while under compression forces. In use notches such as the "V" shaped notches described above can open to a wider angle as the un-notched surface of the pack is fitted around a curved surface, e.g., the outer surface of an inner pipe.

Figure 10A:
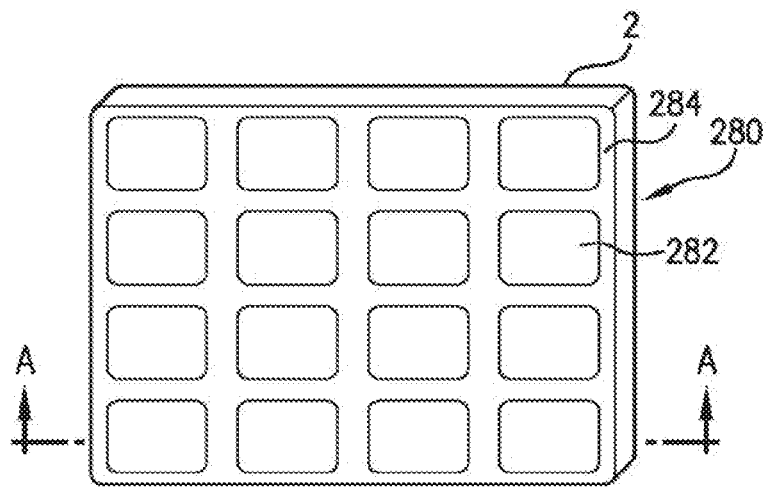
FIG. 10A is a view of a pack having indentations on one side.
Figure 10B:
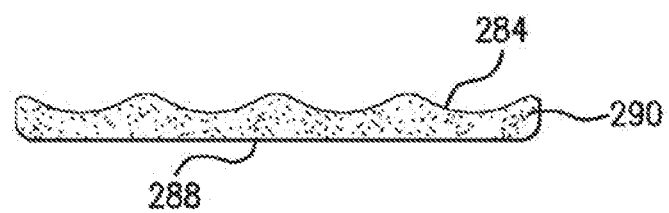
FIG. 10B is a cross-sectional view along plane AA of the pack shown in FIG. 10A.
Figure 10C:
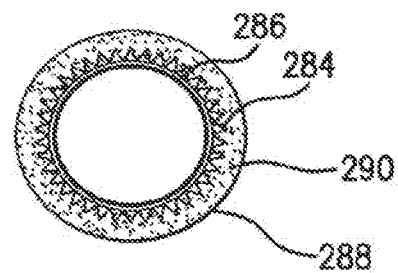
FIG. 10C is a system in which the pack shown in FIGS. 10A and 10B is wrapped around a pipe.

Another arrangement for a flexible container or pack includes cellular indentations on one side of the container. Shown in FIGS. 10A and 10B is pack 280 having indentations 282 on side 284 of the pack. In specific examples pack 280 contains granular material 290 enclosed in a bag or casing and does not include an outer sheath or sleeve surrounding the casing. Indentations 282 can be in a waffle pattern and can be formed before or after filling a bag with particulate insulating material, e.g., granular aerogel, and the initial sealing of the pack. The indentations result in volume being removed from side 284 of the pack and a decrease in the stiffness of the pack in that direction, facilitating wrapping of the pack around a pipe or another curved object. Shown in FIG. 10C, for instance, is a system in which pack 280, containing granular material 290, is wrapped around pipe 286. As seen in FIG. 10C, pack 280 preferably is wrapped with side 284 facings pipe 286 and smooth side 288 facing away from the pipe. The system can further include an outer pipe (not shown In FIG. 10C) at or near smooth side 288.

Flexible insulating elements, i.e., flexible containers or packs, also can be in the form of bubble-wrap, where the "bubbles" are filled with insulating material, preferably granular aerogel.

Figure 11:
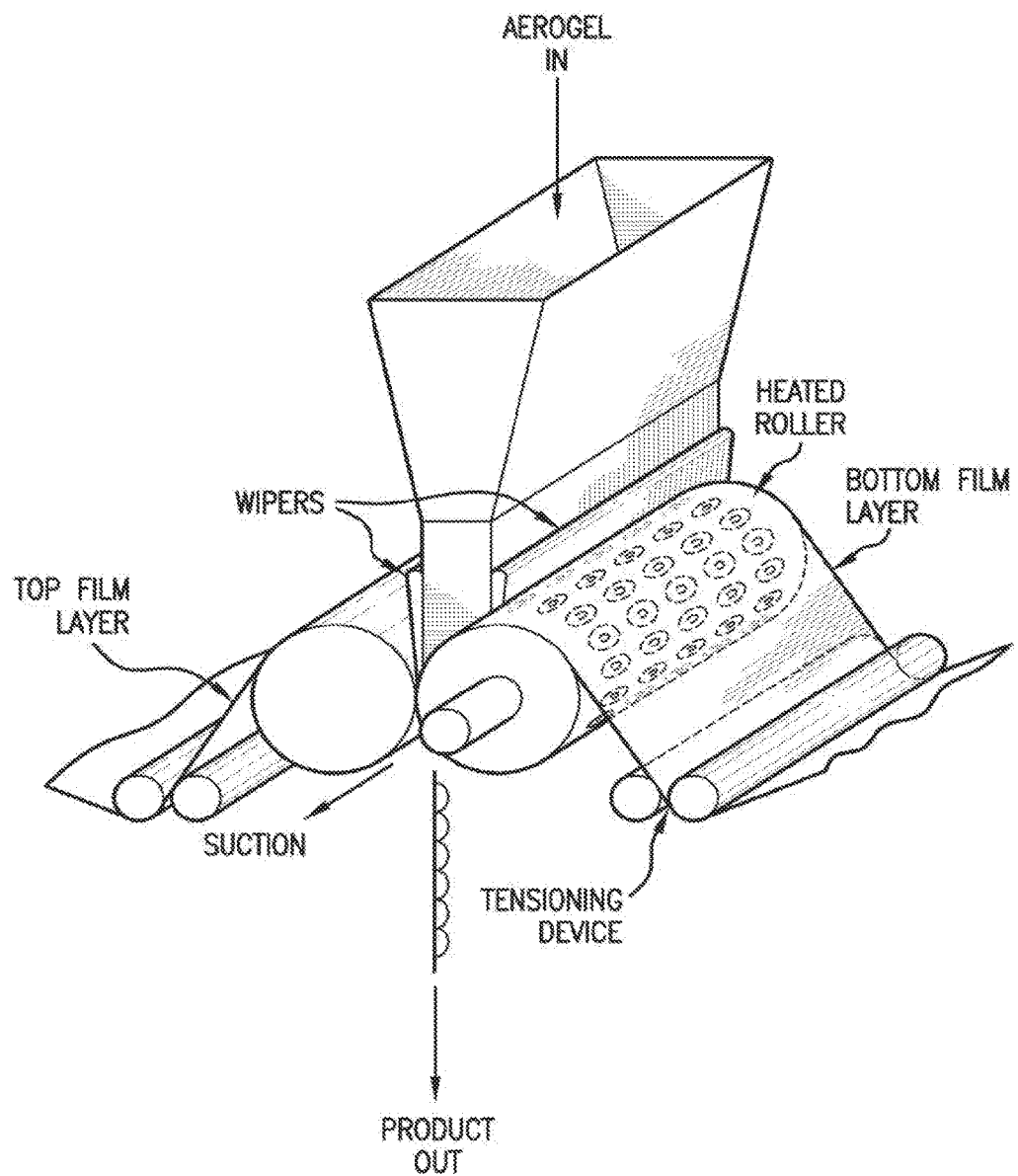
FIG. 11 is a view of a system suitable for producing aerogel-filled bubble-wrap.

A suitable process for producing such a bubble-wrap insulator can employ a system adapted for feeding aerogel or another granular insulating material to a bubble wrap machine such as the RipplePak machine from Uthane Research LTD, or others known in the art. Shown in FIG. 11, for example, is a system including a machine in which a first film layer is fed over a heated vacuum roller to form a bubble layer. A second film layer is fed over a hard rubber roller. A feeding element such as a hopper can be used to drop aerogel granules at the roller nip and wipers are used to keep excess granules away from the sealing area as the two film layers are rolled in the roller nip.

During installation of the assembly, the container can be placed, for example, adjacent to the exterior surface(s) of the inner pipe(s) and/or the interior surface of the outer pipe prior to positioning of the inner pipe(s) and outer pipe to form the annular space. Alternatively, the inner pipe(s) and outer pipe can be positioned to form the annular space prior to positioning the container(s) within the annular space. Insulating material also can be wrapped around the inner pipe. The inner surface of the outer pipe can be lined with insulating material. Other variations will be readily apparent to the ordinarily skilled artisan within the context of the invention, and the inner pipe(s) and/or the outer pipe(s) can be manipulated to achieve the desired positioning of the inner pipe(s) and outer pipe(s).

The container(s) can be held in place with respect to the inner and/or outer pipe in any suitable manner. For instance, the container(s) can be held in place with the use of at least one fastener applied to the exterior surface of the inner pipe(s), the exterior surface of the container(s), or both. Alternatively, at least one fastener can be used to hold the container(s) adjacent to the exterior surface of the inner pipe(s). If two or more containers are employed, the containers can be secured to each other in any suitable manner (e.g., using at least one fastener). Similar approaches can be employed to position and/or hold the container with respect to the inner surface of the outer pipe.

Non-limiting examples of fasteners include adhesive compositions, adhesive tapes, bands, clips, hook-and-eyelet assemblies, and hook-and-loop fasteners. Adhesive compositions can be applied to the exterior surface of the inner pipe(s) and/or the external surface of the container(s) by brushing, rolling or by spraying. Double-sided adhesive tapes can be used as fasteners and can be applied to either a pipe surface or the container(s). The container(s) itself can comprise an adhesive material. The fastener can comprise bands including elastic bands (e.g., rubber or other elastomeric bands), nonelastic bands (e.g., metal, polymer, zip-tie bands), and bands including a nonelastic portion and an elastic portion, wherein the elastic portion can comprise an elastomer or a spring(s). The band can comprise a sheath encircling the container(s) when in place on the inner pipe(s).

When a plurality of containers is used in the context of the invention, desirably the containers will be positioned relative to each other such that gaps defined by the edges of the containers will not be coincident and thereby provide energy transfer passages between the inner pipe(s) and the outer pipe. By way of illustration, when a plurality of elongate arched containers are employed in the context of the invention and placed end-to-end and coextensive with the exterior surface of the inner pipe, the gaps defined by the adjacent elongate edges of containers placed along one section of the inner pipe desirably are staggered with respect to the gaps defined by the adjacent elongate edges of containers placed along an adjacent section of the inner pipe. Similarly, if multiple layers of the containers are utilized in the radial direction between the inner pipe(s) and outer pipe, the edges of the container(s) of the one layer are staggered with respect to the edges of the container(s) of an adjacent layer. In this manner, any potential channels that may result from incomplete filling of the gaps with the compressible material after altering the containers desirably would not extend for more than the length of any one container in any direction within the annular space.

Assembly of the pipe-in-pipe assembly can include the step of placing the inner and outer pipes with respect to each other. Any suitable technique can be employed. For instance, when the outer pipe comprises a plastic material (e.g., thermoplastic or thermoset polymer), the outer pipe can be extruded around the inner pipe(s) to form the outer pipe while simultaneously placing the outer pipe in position around the inner pipe(s).

In other approaches one of the pipes can be held stationary while the other pipe is moved into place. For example, installing an inner pipe structure within an outer pipe structure can be accomplished by laying down the outer pipe structure along its length and sliding the inner pipe structure along the bottom region of the interior surface of the outer pipe structure.

As used herein, the term "pipe structure" refers to a structure that includes a pipe and, optionally, an insulating material. The insulating material can be at an outer surface of the inner pipe and/or an inner surface of the outer pipe. In specific examples, the insulating material is held in one or more containers, such as described herein.

Moving one surface against the other produces friction which in turn interferes with the installation process. Maneuvering heavy pipes presents further difficulties when attempting to slide one pipe within another.

One approach that can be employed to facilitate the pipe-in-pipe installation process uses an insert or sleeve that can be positioned between an inner surface of the outer pipe and the outer surface of the inner pipe. If a container of insulating material is attached, for instance to the outer surface of the inner pipe, the sleeve is positioned between the inner surface of the outer pipe and an outer surface of the container material.

In preferred embodiments, the sleeve generates a layer of gas, e.g., air, to facilitate sliding or gliding one pipe in relation to the other.

In one implementation, the sleeve is provided with a plurality (two and preferably more of openings and pressurized. Gas escapes through the openings forming the gas layer or cushion discussed above. Gas, e.g., air, can be continuously fed to the sleeve and continuously ejected through the openings.

Figure 12A:
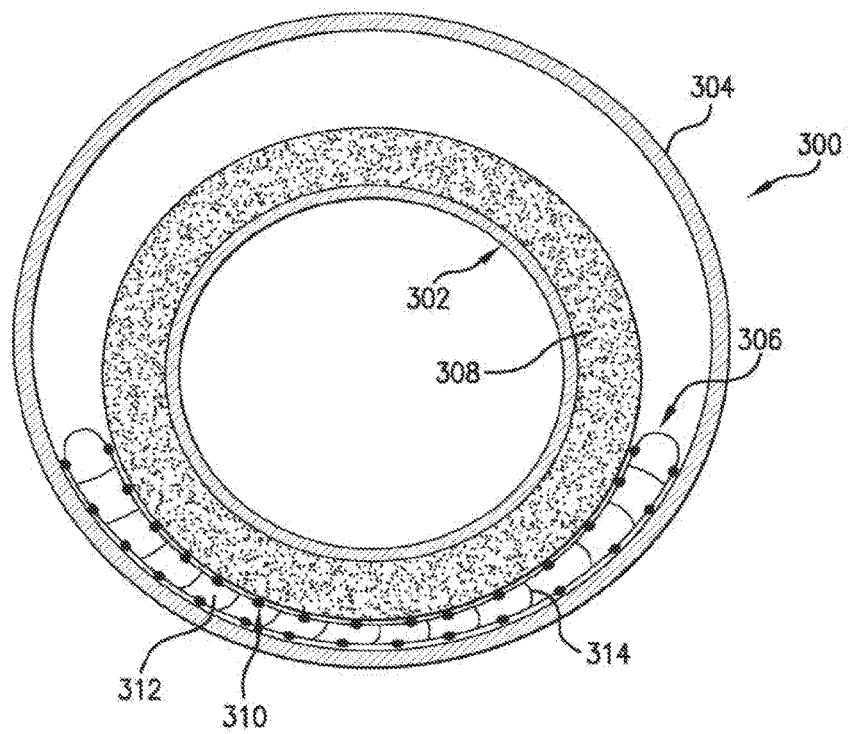
FIG. 12A is a cross-sectional view of an arrangement that can be used to install an inner pipe structure into an outer pipe.

Shown in FIG. 12A is system 300 including inner pipe 302, outer pipe 304 and insert 306. In preferred embodiments, container 308, comprising an insulating material, is at the outer surface of inner pipe 302. In other embodiments, cushion 306 directly contacts the outer surface of inner pipe 302 and inner surface of outer pipe 304.

Insert 306 has holes 310 and can be divided into chambers 312. It can be dimensioned and shaped to fit at the opening of the stationary pipe, e.g., the outer pipe, and can surround all or a portion of the outer circumference of the inner pipe, or all or a portion of the inner circumference of the outer pipe. The length of insert 306 can be essentially the same as the length of the pipes being assembled to form, for instance, a segment of a pipe-in-pipe system. Other suitable length can be selected to facilitate insertion of an inner pipe into an outer pipe or other installation arrangements.

Figure 12B:
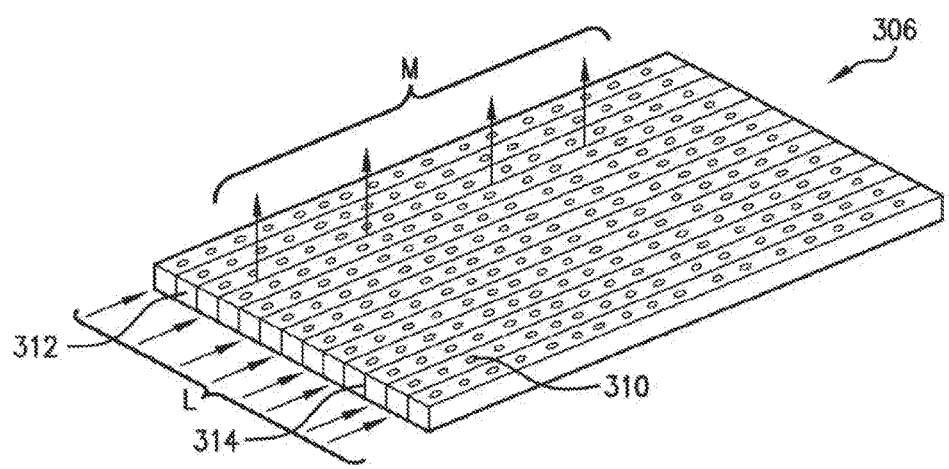
FIG. 12B is a view of an insert that can be employed to install an inner pipe structure into an outer pipe.

In a preferred example, insert 306 is flexible and constructed in a flat configuration, as illustrated in FIG. 12B. Inner supports 314 can be provided to ensure that the insert maintains a thin profile when pressurized. Being flexible, insert 306 can be mounted to conform to the curvature of the inner and/or outer pipe in a pipe in pipe system.

During operation, gas, e.g., air, is fed to the insert in the direction of the arrows L and escapes through holes 310, in the direction of arrows M, generating a gas cushion and facilitating installation.

Insert 306 also can be employed in dismantling pipe in pipe systems. Although particularly useful for pipe-in-pipe installations, air cushions such as generated with insert 306 also can be employed to reduce friction while installing other equipment. For instance solid structures, e.g., rods can be fitted within tubes or pipes and inserts such as described above can be employed to position other types of structures, e.g., for stacking heavy sheets of glass, wood or metal.

In installing pipe-in-pipe systems, at least one optional spacer can be provided and positioned so that the spacer(s) ultimately resides in the at least one annular space. The spacer(s) function to position the inner pipe(s) within the annular space, and/or to position the outer pipes within additional annular spaces if more than one outer pipe is utilized. In an embodiment, the spacer(s) when in place will have a circular or elliptical cross-sectional shape with at least one opening to allow for the passage of the inner and/or outer pipe(s) therethrough. It should be noted that the number of spacers utilized in the insulated pipe-in-pipe assembly of the invention is or can be less than the number that would be otherwise required in a pipe-in-pipe assembly is produced using another prior art method.

The spacer(s) optionally contacts at least a portion of the exterior surface of the inner (or outer) pipe(s) and/or at least a portion of the inner surface of the at least one outer pipe. In the embodiment where the spacer(s) contacts both the exterior surface of the inner pipe(s) and the interior surface of the outer pipe, the spacer(s) can act to transmit a pressure applied to the exterior surface of the outer pipe(s) to the exterior surface of the inner (or outer) pipe(s), and thereby provide increased structural rigidity to the outer pipe(s). Such an embodiment is particularly useful when the pipe-in-pipe assembly is used in deep-sea applications.

In another embodiment, a plurality of spacers, bulkheads and/or centralizers is placed around the exterior of the container(s) and are affixed to the exterior of the container(s) by any suitable means, which embodiment advantageously allows for elimination of a separate step of providing the spacers and positioning the spacers within the annular space. The spacers also can facilitate assembly of the pipe-in-pipe apparatus by protecting the container(s) from accidental breaching, assisting in positioning of the pipes, and the like. The spacers can have any suitable configuration. For example, the spacers can be non-contiguous ribs, or fins, having an elongate dimension that is aligned longitudinally with respect to the outer pipe and the inner pipe(s). The spacers can be circular or semicircular and at least partially surround the container(s). The spacers can be made of any suitable material and can have any suitable cross-sectional geometry e.g., round, flat, triangular, and the like). Preferably, the spacers will comprise an insulating material.

Figure 13A:
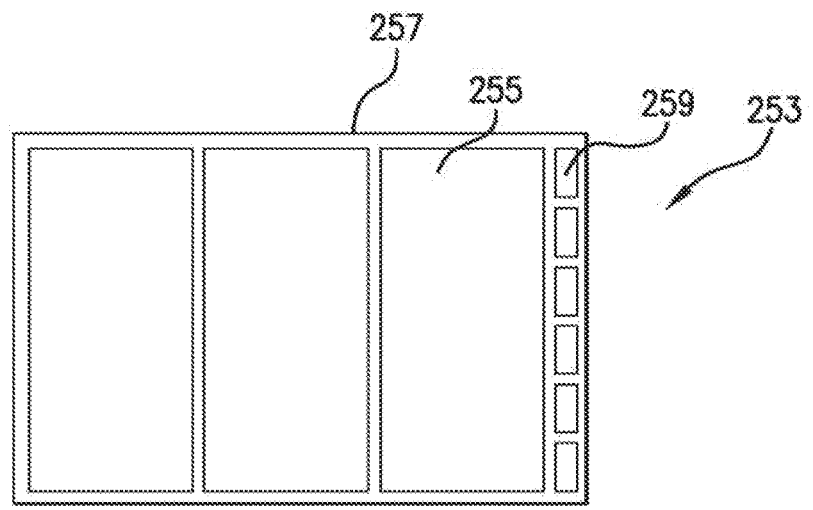
FIG. 13A is a view of an arrangement that includes centralizers affixed to a sheath surrounding containers.
Figure 13B:
FIGS. 13B, 13C and 13D illustrate centralizer designs that can be employed in the arrangement shown in FIG. 13A.
Figure 13D:
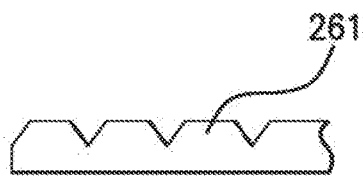
Figure 13C:
Figure 13E:
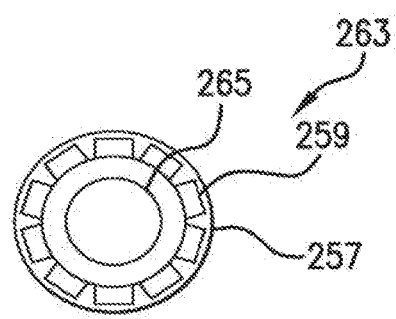
FIG. 13E is a cross-sectional view of a pipe insulated using the arrangement of FIG. 13A

In one implementation, a container that is provided with an outer sheath or sleeve has centralizers that are attached to the sheath. Shown in FIG. 13A, for example, is arrangement 253, shown in flat condition and including packs 255, sheath 257 and centralizers 259 affixed directly to the sheath. Centralizers 259 can be provided as independent blocks, allowing the sheath to wrap around a pipe or another curved body. As illustrated in FIGS. 13B and 13C, the blocks can be flat, or can be arched, e.g., to match the curvature of a pipe. Spacing between blocks and/or the curvature employed can be selected to match specific pipe diameters. Other shapes and/or designs can be employed. For instance, as shown in FIG. 13D, the centralizers can be provided as a bar or strip 261 that is notched to allow bending around a pipe or another curved body. When installed around a pipe, the centralizers preferably face the outer surface of the pipe and the sheath faces outwardly and away from the pipe, as illustrated in FIG. 13E which is a cross-sectional view of system 263. The system includes pipe 265 insulated using arrangement 253 which has centralizers 259 directly affixed to sheath 257.

Spacers or centralizers provide a level of support during bending, snaking or other stress circumstances such that there is a maximum level to which containers such as those described herein will be compressed, thus limiting the amount of permanent set and/or over-compression of the particulate material, e.g., aerogel, utilized. Spacers or centralizers, however, provide potential contact surfaces between pipe and centralizers, leading to possible losses in insulation. To decrease thermal bridging, one or more of the spacer(s) or centralizer(s) employed can be undersized in the radial direction, thus increasing the annular gap at the spacer. The degree of undersizing can depend on factors such as the mechanical properties of the particulate insulating material used, the thickness of the insulating layer, pitch of the spacers and others. In one example, spacers in a pipe-in-pipe system are decreased so that the annular gap is increased from 6 mm (a typical annular gap in a system with an uncompressible insulation material) to 16 mm.

When more than one spacer is used in currently practiced pipe-in-pipe configurations, the spacers are positioned according to the requirements of the design. In reel-day systems, for example, spacers are typically placed about 2 m apart. As described above, in one embodiment of the invention, the mechanical force provided by the insulation material allows for the use of fewer spacers than would otherwise be used today, so that the spacers can be placed at greater distances, e.g. in the reel-lay example, about 2 m (e.g., about 4 m or more, or about 6 m or more, or about 10 m or more, or even about 20 m or more) apart. In another embodiment, the pipe-in-pipe assembly can have no spacers. Because spacers generally provide a lesser degree of insulation than the compressible material of the invention, advantageously the use of fewer spacers improves the overal insulation capacity of the pipe-in-pipe assembly as compared with the use of more spacers, with the greatest improvement in insulation capacity obtained with the use of no spacers.

In addition to or as a replacement for spacers or centralizers such as those discussed above, support can be provided by utilizing containers, e.g., such as the containers described herein. In one embodiment, "support" containers are relatively short, e.g., about 12 inches, and are installed with minimal insertion tolerance between longer, e.g., about 2 m, containers.

Different types of containers can be utilized to provide support, e.g., during insertion, bending, snaking or other high stress circumstances. In one implementation, the support containers are short compressed containers that utilize an outer sleeve to substantially prevent expansion of the container upon breaching. During insertion, bending, snaking or other high stress conditions, the container acts as support, reducing or minimizing the radial forces exerted on any give section of the other containers (e.g., long containers utilized primarily to provide insulation). The latter containers can be containers that are not constrained by an outer sleeve or sheath and thus are free to expand upon activation, e.g., breaching. The amount of set and/or over-compression of a material such as particulate aerogel in the rest of the system is expected to be reduced or minimized.

In another implementation, the support container is pre-compressed and does not employ an outer sleeve or sheath that substantially prevents expansion of the container upon activation. Pre-compression preferably is such that upon bending or under other stresses, there is little remaining compression in the container. For instance, with an expected maximum pressure in the system of 70 psi, a support container can be pre-compressed to 60-70% strain. Once the container is activated, expansion in that region of the system is expected to be minimal. During insertion, bending, snaking or other high stress conditions, pre-compressed sections are expected to exhibit some strain but to a lesser level than in the absence of pre-compression. The degree of set and/or over-compression of a material such as particulate aerogel in the rest of the system is expected to be reduced or minimized in comparison to a system without spacer(s) or centralizer(s).

In joining together pipe-in-pipe segments, welding of the pipes can damage some insulating materials, e.g., aerogel materials. To reduce or minimize such damage, a plate can be disposed to protect the insulating material. The plate can be made of any suitable material.

Containers holding an insulating material may not be designed to withstand the high temperatures reached at the field joint where two outer pipes are welded together. Several approaches can be employed to protect the container during welding. With containers that already employ an outer sheath, for example, this outer sheath can be fabricated from a heat resistant material or combination of materials. For example, the sheath can be fabricated from Teflon-impregnated fiberglass or a fluorinated ethylene propylene (FEP) layer can be added a sheath that is not designed to withstand high temperatures such as those present during welding.

Figure 14:
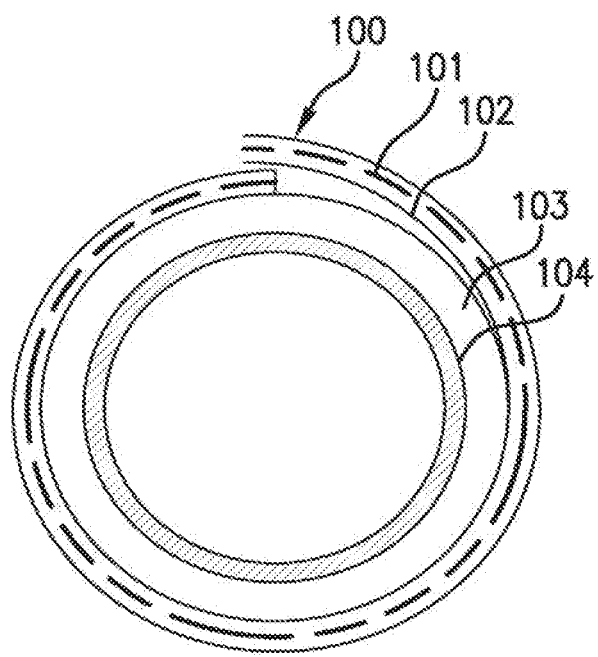
FIG. 14 is a cross section of a heat protective system that can be employed during field joint welding.

Alternatively or in addition to, the container can be provided with heat protective system that includes a wrappable pouch containing one or more panels for heat distribution. Shown in FIG. 14, for example, is heat protective system 100 having heat distribution panel 101 in pouch 102. The insulation pack 103 has a sheath and is disposed around inner pipe 104.

The pouch preferably is fabricated from a heat resistant material, e.g., woven silica/fiberglass. The panel preferably is made of a conductive material, e.g., copper or aluminum, so that the panel distributes the heat. The heat protective system can be sized and cut to fit any pipe size and can be used not only with a container but with other insulation arrangements, e.g., composites such as aerogel-based blankets.

In one implementation, the heat protective system includes a woven silica pouch that includes a section of silica wool and an aluminum panel. In another implementation the heat protective system includes a woven silica pouch that contains an aluminum panel with one side of the pouch extending beyond the aluminum panel and the other side, so that the woven silica material can wrap around the pipe one or more additional times. In yet another implementation, a heat protective system includes a pouch that contains an aluminum panel and one side of woven fiberglass and one side of woven silica. In specific examples, the silica side extends beyond the aluminum panel and the fiberglass side so that it can be wrapped around the pipe one or more additional times. In a further implementation, the heat protective system includes a woven fiberglass pouch that contains a section of silica wool and an aluminum panel. Other arrangements and/or materials can be employed.

To prepare a pipe-in-pipe assembly, a container can be altered as described in U.S. Patent Application Publication No. 2006/272727 A1.

As discussed above, the container comprises a porous, resilient, and volumetrically compressible material, wherein the compressible material is restrained within the container and has a first volume, wherein the first volume of the compressible material is less than the unrestrained volume of the compressible material. When the container is altered, the compressible material will expand to a second volume that is greater than the first volume.

Figure 15A:
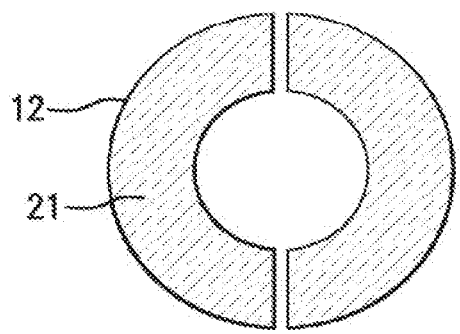
FIG. 15A illustrates a cross-sectional view of two sealed containers of the embodiment of FIG. 1 positioned so as to encircle an inner tubular member.
Figure 15B:
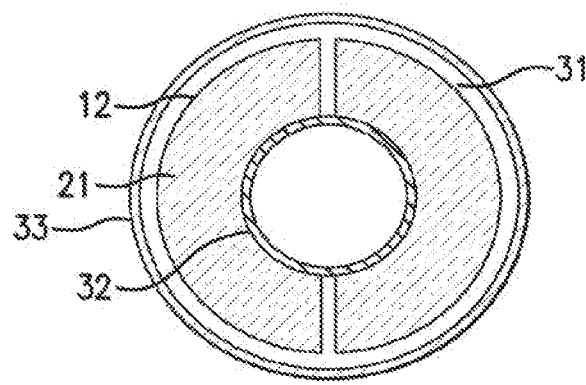
FIG. 15B illustrates a pipe-in-pipe assembly having an inner pipe 5, an outer pipe 6, and two sealed containers of the embodiment of FIG. 1 comprising a porous, resilient, and volumetrically compressible material placed within the annular space defined by an inner pipe and an outer pipe.
Figure 15C:
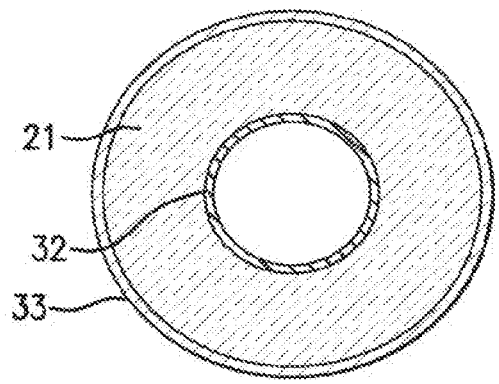
FIG. 15C illustrates the pipe-in-pipe assembly of FIG. 13 after pressure-equalization of the two sealed containers.

An illustration is provided through FIGS. 15A 15B, and 15C. Shown in FIG. 15A is an embodiment comprising two semicircular "half-shell" containers comprising material 12, preferably flexible, surrounding porous, resilient, volumetrically compressible material 21. Positioned in a pipe-in-pipe apparatus as illustrated in FIG. 15B, containers comprising compressible material 21, enclosed within container material 12, are positioned coextensively within the annular space 31 defined by inner pipe 32 and surrounded by outer pipe 33. The container may fill up to one-hundred percent of the annular space. After alteration of the containers, as illustrated in FIG. 15C, the compressible material 21 expands to the extent possible so as to substantially fill the annular space defined by inner pipe 32 and outer pipe 33.

In a specific implementation a method of preparing an insulated pipe-in-pipe assembly comprises (i) providing an assembly comprising (a) at least one inner pipe, (b) at least one outer pipe that is positioned around the at least one inner pipe so as to create an annular space between the exterior surface of the at least one inner pipe and the interior surface of the outer pipe (and optionally additional annular spaces between the exterior surface of an outer pipe and the interior surface of an additional outer pipe), and (c) at least one container comprising porous, resilient, volumetrically compressible material, wherein the compressible material is restrained within the container and has a first volume, wherein the first volume of the compressible material is less than the unrestrained volume of the compressible material, and wherein the at least one container is disposed in the annular space (or one or more of the annular spaces in the event more than one outer pipe is utilized), and (ii) altering the at least one container to reduce the level of restraint on the compressible material to increase the volume of the compressible material to a second volume that is greater than the first volume, thereby forming an insulated pipe-in-pipe assembly.

For example, a method of preparing an insulated pipe-in-pipe assembly comprises (i) providing at least one inner pipe with an exterior surface, (ii) providing at least one an outer pipe with an interior surface that is positioned around the at least one inner pipe (or outer pipe) so as to create an annular space between the exterior surface of the inner pipe and the interior surface of the outer pipe (and/or the exterior surface of an outer pipe and the interior surface of another outer pipe), (iii) providing at least one container comprising porous, resilient, volumetrically compressible material, wherein the compressible material is restrained within the container and has a first volume, and wherein the first volume of the compressible material is less than the unrestrained volume of the compressible material, (iv) positioning the at least one container so that it ultimately is disposed in the annular space(s), and (v) altering the at least one container to reduce the level of restraint on the compressible material to increase the volume of the compressible material to a second volume that is greater than the first volume, thereby forming an insulated pipe-in-pipe assembly, wherein steps (i)-(iv) can be carried out in any suitable order.

For example, steps (i)-(iv) can be carried out in the order recited above. Alternatively, steps (i)-(iv) can be carried out as follows: (i) providing at least one inner pipe with an exterior surface, (ii) providing at least one container comprising porous, resilient, volumetrically compressible material, wherein the compressible material is restrained within the container and has a first volume, and wherein the first volume of the compressible material is less than the unrestrained volume of the compressible material, (iii) positioning the at least one container proximate to the exterior surface of the at least one inner pipe, (iv) providing an outer pipe with an interior surface that is positioned around the at least one inner pipe and the at least one container so as to create an annular space between the exterior surface of the at least one inner pipe and the interior surface of the outer pipe, wherein the at least one container is ultimately disposed in the annular space.

Also, steps (i)-(iv) can be carried out as follows: (i) providing an outer pipe with an interior surface, (ii) providing at least one container comprising porous, resilient, volumetrically compressible material, wherein the compressible material is restrained within the container and has a first volume, and wherein the first volume of the compressible material is less than the unrestrained volume of the compressible material, (iii) positioning the at least one container proximate to the interior surface of the outer pipe, (iv) providing at least one inner pipe with an exterior surface that is positioned within the outer pipe so as to create an annular space between the exterior surface of the at least one inner pipe and the interior surface of the outer pipe, wherein the at least one container is ultimately disposed in the annular space. Variations on the above method whereby additional outer pipes are used will be readily apparent to those skilled in the art.

In a first embodiment a container is altered by modifying the pressure within the container, preferably from a lower initial pressure to a higher final pressure. Equalization of the gas pressure in the container with the gas pressure in the annular space, allows compressible material within the container to expand to a greater volume.

In a specific example, a container that includes a porous, resilient, volumetrically compressible material, enclosed in a flexible gas-impermeable material, is placed inside a pressure chamber and the pressure in the chamber is reduced below atmospheric pressure. The container is sealed to be gas impermeable while the container is maintained at the reduced pressure in the chamber. The reduced pressure in the container can be any pressure that is less than atmospheric pressure. Typically, the reduced pressure is about 1 kPa or more (e.g., about 10 kPa or more, or about 20 kPa or more). Preferably, the reduced pressure is about 100 kPa or less (e.g., about 75 kPa or less, or about 50 kPa or less).

Once the container has been sealed it is removed from the pressure chamber and the pressure outside the container returns to atmospheric conditions while the pressure inside the container is maintained at the reduced pressure level present during the sealing of the container.

Since the gas pressure within the sealed container is below atmospheric pressure, the sealed container and its contents will be subject to the pressure differential between atmospheric pressure outside the sealed container and the reduced gas pressure within the sealed container. Since the container is flexible and the compressible material has an elastic compressibility, when an external pressure (in this case atmospheric pressure) is applied to the sealed container and the compressible material, the volume of the sealed container and the compressible material will decrease. Thus, in this method embodiment, the compressible material is restrained within the sealed container at the first volume by the action of atmospheric pressure upon the sealed container.

Upon altering the at least one sealed container so as to equalize the pressure in the sealed container with the pressure within the annular space, the compressible material will expand volumetrically, provided that the container allows for expansion of the compressible material. For example, the container can be physically breached (e.g., punctured or degraded) thus allowing pressure equalization and expansion of the compressible material.

Typically, the pressure within the annular space is substantially at atmospheric pressure during practice of the inventive method. In the first embodiment wherein the container(s) comprises a sealed container(s) at a first volume under a reduced pressure, the pressure differential between the reduced gas pressure within the sealed container(s) and the pressure within the annular space can be maximized to allow for maximum expansion of the compressible materials upon equalization of the pressure within the sealed container(s) with the pressure within the annular space.

If the annular space is sealed at the terminal ends of the assembly to provide a fully enclosed annular space, the pressure within the annular space can be reduced to below atmospheric pressure, preferably after equalizing the pressure within the sealed container(s) with the pressure within the annular space. The pressure within the annular space can also be maintained at atmospheric pressure or increased to above atmospheric pressure after sealing the terminal ends of the assembly.

In a second embodiment of the invention, a container is altered to permit an increase in the volume of the compressible material and thereby form an insulated pipe-in-pipe assembly. Preferably, the compressible material is restrained is restrained at the first volume within the at least one container. That is, the container itself restrains the compressible material without or, alternatively, in addition to the action of a pressure differential between the pressure within the container and the pressure outside the container. In this regard, alteration refers to any operation that allows the compressible material to expand.

Subsequently, the container may be altered to reduce the level of restraint on the compressible material to increase the volume of the compressible material to a second volume that is greater than the first volume, thereby forming an insulated pipe-in-pipe assembly. Examples of suitable alterations include destroying the integrity of the container, transforming an inelastic container to an elastic container, or removing or altering the restraining means for the container. Suitable techniques for altering the container(s) can be the same as techniques for breaching sealed containers as recited herein.

After alteration of the container(s), the compressible material will expand within the annular space, expanding to substantially fill the annular space and thus provide a substantially uniform distribution of compressible material within the annular space. Subsequently, the annular space preferably is substantially free of any voids or gaps, especially such voids or gaps that degrade the thermal performance of the system.

The volume of the container(s) before altering the container(s) is less than or equal to the volume of the annular space. As a result, the annular space allows for fitment of the container(s) into the annular space and allows for at least some expansion of compressible material within the annular space. Typically, the volume of the container(s) before altering the container(s) is about 99% or less (e.g., about 95% or less, or about 90% or less, or about 85% or less) of the volume of the annular space. Preferably, the volume of the container(s) before altering the container(s) is about 70% or more (e.g., about 80% or more, or about 85% or more) of the volume of the annular space. The volume of the container(s) is typically chosen based on the configuration of the container(s) and on the degree to which the compressible material will remain compressed after alteration of the container(s).

The difference between the first volume of the compressible material under restraint and the unrestrained volume of the compressible material is representative of the amount of compression the compressible material is subjected to when enclosed within the container(s). Typically, the first volume of the compressible material under restraint is about 80% or less e.g., about 70% or less, or about 60% or less, or even about 50% or less) of the unrestrained volume of the compressible material.

After altering the container(s) to reduce the level of restraint on the compressible material, the compressible material desirably substantially fills the annular space. As noted above, the compressible material preferably will expand within the annular space and will fill any voids within the annular space, thus providing a substantially uniform distribution of the compressible material within the annular space.

In one embodiment, the compressible material, after altering the container(s), has substantially the unrestrained volume of the compressible material, which volume is substantially the volume of the annular space.

In another embodiment, the compressible material, after altering the container(s), has an unrestrained volume that is about 1% or more, preferably about 10% or more (e.g., about 20% or more, or about 30% or more greater than the volume of the annular space. In other words, the second volume of the compressible material in the annular space after altering the container(s) is at least about 9% (e.g., at least about 17%, or at least about 23%) less than the unrestrained volume of the compressible material. That is, the compressible material desirably would overfill the annular space after altering the container(s) if not for the restraint on the compressible material by the inner and outer pipes.

The overfilling of the annular space with the compressible material is desirable because of the improvement in the insulating characteristics of the pipe-in-pipe assembly resulting from the filling of voids within the annular space with the compressible material and the continuing compression to some extent of the compressible material after altering the container(s) which can improve insulation performance. The residual force associated with the overfilling of the annular space assists in migrating or moving the compressible material into voids within the annular space and thus improves the uniformity of distribution of the compressible material within the annular space. Further, the residual force can permit the use of the compressed material to obtain mechanical benefits as a means of transferring longitudinal and/or radical force(s) between the inner pipe(s) and the outer pipe. In particular, this residual force creates a level of friction between the inner pipe(s) and compressible material, and/or the outer pipe and the compressible material, so as to help prevent unwanted movement of the pipes within of the pipe-in-pipe assembly.

In a preferred embodiment, (a) the first volume of the compressible material in the container(s) is about 70% or less of the volume of the unrestrained volume of the compressible material, (b) the first volume of the compressible material in the container(s) is less than the volume of the annular space (e.g., about 99% or less, or about 95% or less), and (c) the second volume of the compressible material in the annular space after altering the container(s) is greater than or equal to about 1%, (preferably 10%-33%) less than the unrestrained volume of the compressible material.

Typically, when a pipe-in-pipe assembly is placed into operation and when a fluid (e.g., a liquid or a gas) is flowed through the inner pipe(s), wherein the fluid is at a different temperature than the temperature to which the outer pipe is subject, the inner pipe(s) expands or contracts relative to the outer pipe due to the temperature differential applied to the inner pipe(s) vis a vis the outer pipe, depending on whether the temperature of the fluid is higher or lower than the external temperature. This differential expansion of the inner pipe(s) and the outer pipe produces longitudinal forces between the pipes. When the inner pipe(s) and the outer pipe are joined together, for example, by connecting means, welding or bulkheads, the stresses (e.g., longitudinal forces) generated by the differential expansion or contraction of the inner pipe(s) relative to the outer pipe are concentrated at the points of junction (e.g., at the connecting means, welds or bulkheads) or at weak points in a pipe, and will result in deformation of the structure, manifested in a curvature being generated in the structure, or rupture of the pipe. Advantageously, the compressible material, when under compression due to overfilling of the annular space, provides a means of transferring longitudinal forces between the inner pipe(s) and outer pipe, thereby reducing the stress placed on the connecting means or welds between the pipes and also accommodating "kinking" (e.g., deviation from linearity) of the assembly by transferring radial forces. Desirably, the compressed compressible material provides the primary means of transferring the longitudinal forces between the inner and outer pipes by allowing for coupling of the motion of the outer pipe and the inner pipe(s) relative to each other. In addition to the amelioration of stresses caused by differential expansion or contraction of the inner and outer pipes, advantageously the handling of the pipe-in-pipe assemblies is simplified by at least partial reduction of the need to simultaneously secure both inner pipe(s) and outer pipe to avoid unwanted slipping of the inner pipe(s) and outer pipe with respect to each other, for example, when moving the assembly (e.g., placing the assembly into operation).

The alteration of the container(s) can be accomplished by any suitable technique. Several examples are described below.

In one embodiment, a container is sealed and has a valve or a closed port that, when opened, allows for the introduction of a gas into the container to equalize the pressure within the sealed container with the pressure within the annular space, while otherwise maintaining the integrity of the sealed container. Such a valve could be a small disc with a membrane made of a semi-permeable material (e.g. a thin polyethylene layer or patch) and covered with a removable impermeable material that can be in the form of a sticker. Upon removal of the impermeable material, air can pass through the semi-permeable material in such a way that pressure is equalized. In preferred examples, valve characteristics would allow sufficient time, e.g., 6-12 hours, before any significant amount of air can pass through the membrane. In one embodiment the impermeable material is brightly colored or flagged for easy identification. During installation of two or more containers, impermeable material, e.g., stickers, can be removed sequentially, simultaneously or nearly simultaneously. If simultaneous or nearly simultaneous breaching is desired, the membrane, e.g., semi-permeable patch, can be designed to let air through at a consistent rate from patch to patch.

In another embodiment, a container is sealed and is breached so as to destroy the integrity of at least a part of the sealed container. Any suitable method can be employed to breach a container.

Breaching of a container can be accomplished, for instance, by heating of the container, for instance to a temperature sufficient to induce a phase transition in the material comprising the container (e.g., melting transition or glass transition) or to induce decomposition of the material comprising the container. The heating can be accomplished using any suitable means. For example, a container can be heated as a result of a welding operation carried out on the inner or outer pipe of the pipe-in-pipe assembly. Alternatively, or in addition, heat can be applied to the inner and/or outer pipe(s) of the pipe-in-pipe assembly independently of any welding operation and can be selectively applied to any suitable section of the inner or outer pipe(s) to induce breaching of the container at any preselected place or places along the pipe-in-pipe assembly.

Heating of a container can be accomplished by use of a laser beam having any suitable fixed frequency or having a frequency that is varied in a predetermined manner. The laser beam can impinge directly on at least a portion of a surface of the container to heat at least a portion of the container and cause breaching of the container. When the pipe-in-pipe assembly comprises a plurality of (e.g., two or more) containers, the laser beam can be moved across at least a portion of a surface of each container. Alternatively, the laser beam can be used to cause local heating of at least a portion of one of the surfaces defining the annulus wherein the heated surface subsequently heats the container(s). The laser source can be maintained outside of the annulus or can be placed within or moved through the annulus.

The container surface can be heated directly to cause breaching. An assembly comprising a guide rod or guide line having a heating member slidably connected thereto, which heating member comprises heating means, can be introduced into the annulus of the pipe-in-pipe apparatus. Examples of suitable heating means include but are not limited to electrically resistive heating elements, open flames, and means for delivering hot gases to the surface of the container(s). In use, the heating member can be moved along the guide rod through the annulus from one end to the other while contacting the surface of the container(s) to cause breaching thereof. The guide rod and heating member optionally then can be removed from the annulus, e.g., for use in other assemblies. The heating member can be moved at a constant or variable rate through the annulus. The heating member can be fixed to a rod or bar and moved through the annulus manually or mechanically to effect breaching of the container(s).

In other implementations, the heating member also can be configured to have the same or substantially the same length as the pipe-in-pipe assembly so as to provide heat simultaneously throughout the annulus. An example of such an embodiment is a heated pipe, wherein the pipe is heated by means of a hot fluid contained therein. The hot fluid can be introduced into the pipe before use, or can be circulated through the pipe by means of a pump. The heated pipe can be the inner pipe(s) itself, wherein a hot fluid is pumped through the inner pipe(s) to heat the entire pipe-in-pipe assembly to a sufficient temperature and a sufficient length of time to cause breaching of the container(s).

Heating of the container(s) can be accomplished by means of ultrasonic heating. An ultrasonic heating apparatus can be introduced into the annulus and used to heat at least a portion of the container(s) to effect breaching thereof. When the outer and/or inner pipe comprises a metal, induction heating of the metal pipe(s) can be used to heat the container(s) and effect the breaching thereof.

The container(s) can be fabricated with an electrically resistive element attached to the outer or inner surface thereof or incorporated into material comprising the container(s). The electrically resistive element can comprise a wire, a plate, or similar configuration. On passage of an electrical current through the electrically resistive element, the element will generate heat which leads to breaching of the container(s). When the electrically resistive element is a wire, the wire can be configured on a surface of the container(s) to breach the container(s) in a predetermined pattern. For example, the wire can be wrapped around the container(s) in a helical manner to ensure breaching of the container(s) in a uniform manner about the external surface thereof.

In addition to local heating, breaching of a container can be accomplished by raising the temperature within the annulus and maintaining an elevated temperature for an appropriate length of time to ensure satisfactory breaching of the container. For example, a flow of hot gas can be passed through the annulus to soften, melt, or otherwise degrade the container.

Mechanical means also can be employed. For example, a cutting assembly comprising at least one sharp edge can be positioned within and optionally moved through the annulus of the pipe-in-pipe assembly so that the at least one sharp edge tears or cuts the container(s) to accomplish breaching. The at least one sharp edge can be a knife, a pin or spike, a saw blade a string or wire with sharp materials (such as broken glass) affixed thereto or any combination of the above. The cutting assembly can be slidably connected to a guide rod or guide wire, wherein the guide rod or wire is placed within the annulus followed by movement of the cutting assembly along the guide rod or wire to breach the container(s) therein. The cutting assembly also can be affixed to a guide rod, and breaching can be accomplished by moving the cutting assembly and the guide rod through the annulus.

The container(s) can comprise means for guiding a heating assembly or cutting assembly through the annulus close to a surface of the container(s) to ensure breaching of the container(s). For example, the container(s) can have a guide tube or ferrule attached to a surface thereof into which a guide rod can be inserted. A heating or cutting assembly can then be slidably moved along the guide rod to effect breaching of the container(s). When a heating assembly is employed for breaching, the guide tube can comprise a thermally conductive material (e.g., a metal) to facilitate transfer of heat from the heating assembly to a surface of the container(s).

The container(s) can be mechanically breached by compression upon bending of the assembled pipe-in-pipe assembly. The pipe-in-pipe assemblies described herein can be joined end-to-end to form a pipeline. In practice, assembled pipelines are often taken up on spools to allow for transportation of long pipelines on pipeline-laying ships. The process of spooling requires bending of the pipelines and individual segments thereof. The bending can result in compression of the container(s) between outer and inner pipes so as to breach the container(s).

When a container is sealed to be gas-impermeable and is at a reduced gas pressure that is less than atmospheric pressure, the container can be breached before installation in a manner such that the expansion of the container occurs on a time scale that allows for completion of the pipe-in-pipe assembly before the container is fully expanded. For example, small diameter holes can be introduced into the container prior to completing the pipe-in-pipe assembly. Alternatively, means for breaching such as a valve or otherwise sealed opening can be incorporated into the container itself, which valve or opening is designed to admit gas into the container at a controlled rate so as to allow sufficient time for completion of the pipe-in-pipe assembly before full expansion of the container occurs.

In some examples, the pipe-in-pipe arrangement is prepared by using vacuum packed containers that are sealed and placed in the pipe-in-pipe system. Before the packs are breached the total system is sealed. Once the bags are breached the overall pressure in the system will be less than the starting pressure.

In specific examples, the container is provided with a semipermeable membrane, fine hole(s) or other breaching means preferably resulting in a gradual pressure equilibration between the annular space pressure and the container. In preferred implementations, pressure equilibration takes several hours, a day or even several days.

In other implementations, the annular space is sealed after the container is deployed and the equilibration is slower than the time period required for sealing the annular space. The annular space can be sealed with bulkheads, forged pipe ends and so forth. Vacuum-tight seals are preferred.

In one aspect, breaching can be accomplished by using containers that are enclosed in whole or in part in membranes that are partially permeable to a gas, e.g. air or another gas present in the annular space. Such membranes also referred to herein as "semi-permeable", allow a gradual transfer of gas from the annular space into the container. The rate of transfer can depend on factors such as the nature of the membrane material, its thickness, pressure drop across the membrane and so forth. It is also possible to drill very fine holes into non-permeable materials to allow a gradual transfer of gas, e.g., air.

Preferably, the gas transfer across the semipermeable membrane is activated during or after installation of the container in a pipe-in-pipe assembly. Activation immediately before deployment of the container also can be used.

To prevent air from entering an evacuated container post manufacturing and before the installation process, e.g., during transportation or storage, the container can be further encased in a membrane that is air impermeable. To initiate a gas leak across the semipermeable membrane, the impermeable membrane can be removed or breached, e.g., by removing a tape or tab.

Containers can be breached using chemical means one method comprises use of a device which releases a solvent or chemical agent that dissolves or reacts with the material enclosing the container to degrade the integrity of the container, thereby causing a breach of the container. The device can be affixed to the surface of the container by adhesive or other suitable means, and can be affixed before, during, or after assembly of the pipe-in-pipe apparatus. The device also can contain a reactant that reacts exothermically with the material comprising the container, or a mixture of reactants that react with the material of the container and/or with each other, thereby supplying localized heating to the surface of the container and thus effect breaching thereof. The device can contain an explosive material (e.g., a blasting cap or similar device) so that, when detonated, the resulting shock wave mechanically disrupts the container and leads to breaching thereof. The device can comprise an ignitable cord, such as a fuse, which cord can be affixed to the interior or the exterior surface of the container. Upon ignition, the ignitable cord will burn through the surface of the container and breach it.

In some situations, packs including a particulate insulator such as granular aerogel are installed in locations where using direct puncture and/or heat trace wires presents difficulties or is not feasible. Several breaching techniques can be employed in such cases. A slow leak method, for example, uses a patch of gas permeable material on the vacuum pouches. The gas permeable material preferably is exposed prior to installation. A zip cord method utilizes a wire that is installed underneath the container. The wire has a highly abrasive surface and can be pulled by a cord. After installation, the cord is pulled, e.g., a short distance, generating a cut at the interface between the abrasive wire and the container, thus breaching the container. Induction heating can be used by placing a metallic object on the surface of the container and an induction heater can be passed along the outside of the enclosed are, heating the metal and effecting the breach. To obtain longer runs than those generally available with resistive wires, heat trace pads, e.g. resistive heating pads, can be placed at intermittent locations along a wire.

When the pipe-in-pipe assembly comprises at least one spacer, the spacer(s) can further comprise means for breaching or alteration of the container(s) by the breaching and alteration methods recited herein. For example, the spacer(s) can comprise a heating means, mechanical means, or chemical means to breach or alter the container(s) upon placement of the container(s) within the annulus or at any predetermined time thereafter.

In containers that are not sealed, alteration can be performed as in the case of the sealed container(s) but may not require introducing a gas to equalize pressure in the sealed container(s). Alteration of containers that are not sealed may further include alteration of any restraining means to reduce the level of restraint on the compressible material. Alteration of restraining means can be the same as previously recited herein for breaching of sealed container(s), and the adaptation of the breaching methods to the alteration of the restraining means will be readily apparent to the ordinarily skilled artisan.

The remnant of (or residue from) a container that previously held the compressible material can comprise the entire container after alteration, or any portion of the container after alteration. For example, if the alteration comprises a destructive alteration of the container, such as melting or irreversibly degrading at least a portion thereof, at least a portion of the container will remain in the annular space thereafter.

Optionally, at least one end of the pipe-in-pipe assembly is sealed. All ends of the pipe-in-pipe assembly can be sealed so as to fully enclose the annular space (while allowing product flow within one or more inner pipes). Any suitable method can be used to seal one or more ends of the pipe-in-pipe assembly, a number of which are well known in the art. In this regard, pipe-in-pipe assemblies having three or more ends are also considered to be within the scope of the invention, including, for example, pipe-in-pipe arrangements having a "T" or a "Y" configuration, which configurations have three ends. Other configurations, such as a "U" expansion loop will be readily apparent to the ordinarily skilled artisan.

Preparing the pipe-in-pipe assembly can include other optional steps. For example, one optional additional step comprises verifying the alteration of the container(s) and/or restraining means. Suitable methods for verifying the alteration of the container(s) and/or restraining means include but are not limited to visual methods, ultrasound imaging techniques, and X-ray imaging. Verification methods can be practiced during alteration of the container(s) and/or restraining means to ensure proper alteration, or can be practiced after alteration.

A pipe-in-pipe assembly resulting from techniques described herein can include (a) at leak one inner pipe with an exterior surface, (b) an outer pipe with an interior surface that is disposed around the at least one inner pipe, (c) an annular space between the interior surface of the outer pipe and the exterior surface of the at least one inner pipe, (d) a porous, resilient, compressible material disposed in the annular space, and (e) a remnant of a container that previously was positioned in the annular space and previously held the compressible material in a volume less than the volume of the compressible material in the annular space. The various elements of the insulated pipe-in-pipe assembly are as previously described herein.

An example provides an insulated pipe-in-pipe assembly comprising (a) at least one inner pipe with an exterior surface, (b) an outer pipe with an interior surface that is disposed around the at least one inner pipe, (c) an annular space between the interior surface of the outer pipe and the exterior surface of the at least one inner pipe, and (d) nanoporous silica disposed in the annular space, wherein the nanoporous silica has a density between 80 kg/m·sup.3 and about 140 kg/m·sup.3 and a thermal conductivity of about 20 mW/mK or less (e.g., about 12 mW/mK to about 20 mW/mK) when measured between a surface at about 0.degree. C. and a surface at about 25.degree. C. The insulated pipe-in-pipe assembly can be prepared by the methods previously recited herein, and the nanoporous silica can be as previously recited herein. The thermal conductivity can be measured, for example, in accordance with ASTM C518.

A pipe-in-pipe apparatus formed by techniques described herein can include a plurality of outer pipes (e.g., a pipe-in-pipe-in-pipe structure). For example, the pipe-in-pipe apparatus can comprise at least one inner pipe disposed within a first outer pipe, and a second outer pipe disposed around the first outer pipe. A porous, resilient, volumetrically compressible material, or any suitable material, or no material whatsoever can be disposed in the annular space defined by the exterior surface of the first outer pipe and the interior surface of the second outer pipe. More particularly, embodiments are contemplated wherein such porous, resilient, volumetrically compressible material occupies at least one of the annular spaces between the exterior surface of the inner pipe and the interior surface of a first outer pipe; and between the exterior surface of the first outer pipe and the interior surface of the second outer pipe, and so on. Such material may or may not be restrained by a container. It is noted that in embodiments where an annular space is not occupied by the porous, resilient, volumetrically compressible material, such annular space can be filled with any suitable material (including but not limited to, uncompressed porous, resilient, volumetrically compressible material, blankets containing such material, aerogel blankets, polyurethane foam, glass beads, fibers (in woven, nonwoven, loose or other forms), particulate or non-particulate materials, or even no material whatsoever.

A pipe-in-pipe system prepared in accordance with methods described herein can include an insulated pipe-in-pipe system comprising (a) two insulated pipe-in-pipe assemblies wherein the length of the at least one inner pipe is greater than the length of the outer pipe, and wherein the opposing ends of the inner pipe(s) extend beyond the opposing ends of the outer pipe, and wherein an end of the inner pipe(s) of one of the two insulated pipe-in-pipe assemblies is sealably connected to an end of the inner pipe(s) of the other of the two insulated pipe-in-pipe assemblies so that the inner pipes are abutting and in communication with one another for fluid flow therethrough, and (b) sleeve in the form of a tubular structure having a bore which has a size to receive the pipe-in-pipe assemblies, wherein one end of the sleeve is sealably connected to the outer pipe of one of the two insulated pipe-in-pipe assemblies and the other end of the sleeve is sealably connected to the outer pipe of the other of the two insulated pipe-in-pipe assemblies. The insulated pipe-in-pipe system optionally further comprises an insulating material disposed in the space between the sleeve and the inner pipes of the two insulated pipe-in-pipe assemblies. The various elements of the insulated pipe-in-pipe assembly are as previously described herein.

In some aspects, the invention is directed to arrangements in which the insulating material, e.g., aerogel, is not encased to form a container. Rather the insulating material is provided to the annular space as loose fill or in monolithic form, e.g., a blanket.

Figure 16:
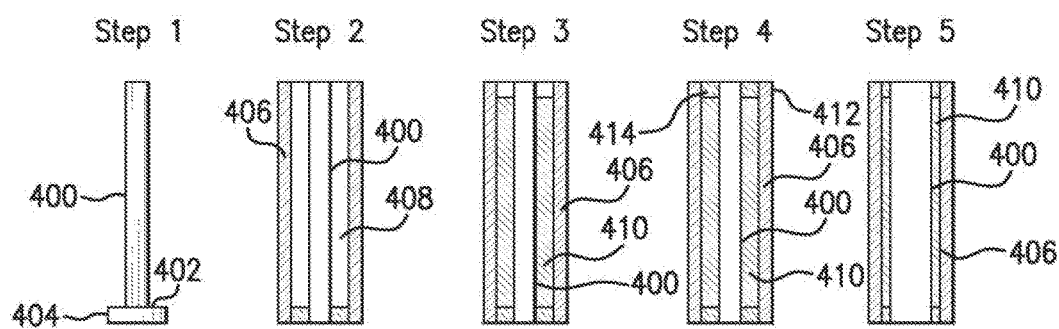
FIG. 16 is a diagram illustrating steps conducted to compress a loose insulating material by expansion of a flow pipe.

One possible sequence of steps for preparing a pipe-in-pipe assembly that employs loose fill insulating particles, e.g., Nanogel® particles, is illustrated in FIG. 16. The assembly process can begin with Step 1, which involves closing one end of flow pipe 400 referred to herein as flow pipe. Any suitable means can be employed. Preferably, materials employed to close pipe ends are capable of containing loose fill materials and allow passage of air during the assembly process. Since aerogel materials have attractive insulating properties, a preferred approach is to close end 402 of flow pipe 400 using a section 404 of monolithic aerogel, e.g., an aerogel blanket.

In Step 2, flow pipe 400 is slipped in outer pipe 406 forming annular space 408, essentially as described above. In Step 3, annular space 408 is filled with loose fill insulating material 410, preferably particulate aerogel. In Step 4, end 412 is capped, essentially as described above, using, for instance, section 414 of an aerogel blanket.

Figure 17:
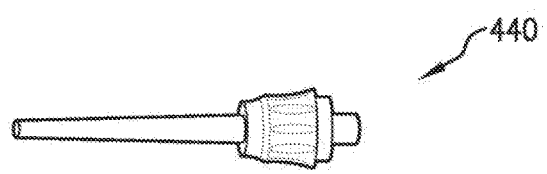
FIG. 17 is a view of a tubing expander that can be employed to expand a flow pipe.

In step 5, particulate material 410 is compressed by radially expanding flow pipe 400 outwardly, towards outer pipe 406. This operation results in an increase in the volume of the flow conduit formed by flow pipe 400 and a decrease of the volume of the annular space. In a preferred embodiment, flow pipe 400 is expanded by using a tubing expander. Tubing expanders are tools known in the HVAC industry, and are often used in the construction of heat exchangers. Shown in FIG. 17 is tubing expander 440.

The tubing expander can be pulled through flow pipe 400 by using a motor, compressed air or other suitable means.

Figure 18A:
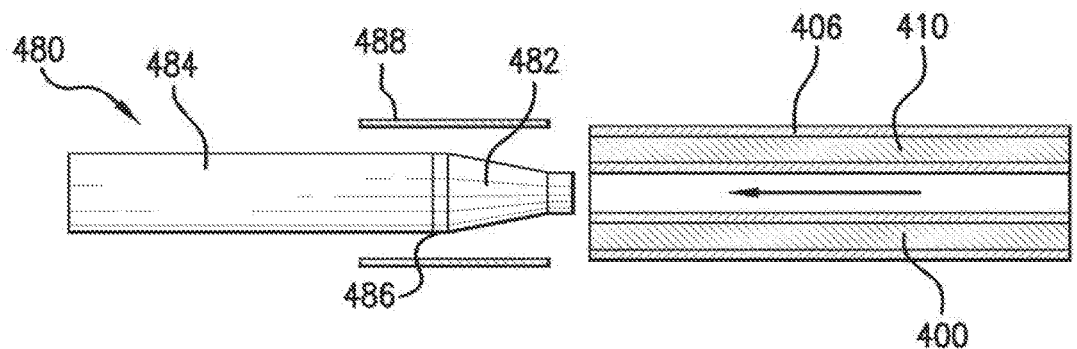
FIG. 18A and FIG. 18B are cross-sectional views of an apparatus at the beginning and the end of expanding a flow pipe to compress insulating material in the annular space.
Figure 18B:
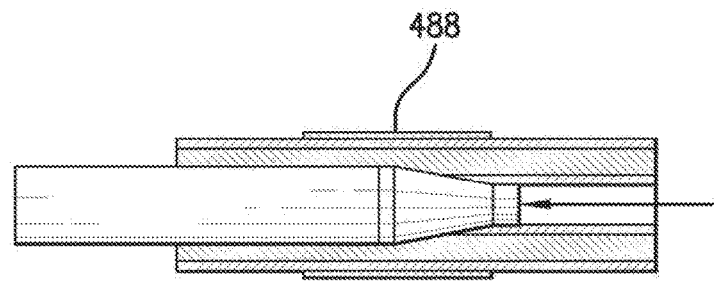

For a flow pipe made of a rigid plastic material, heating can be employed to soften the pipe to an expanded inner circumference followed by cooling at the new expanded circumference. One possible approach employs a heated mandrel as shown in FIGS. 18A and 18B. Shown in FIG. 18A is apparatus 480 that can be employed to expand a flow pipe in a pipe-in-pipe arrangement, having flow pipe 400, outer pipe 406 and loose insulating material 410, such as obtained at the end of Step 4 in FIG. 16. As shown in FIG. 18A the pipe in pipe is moved in the direction of the arrow over heated expanded tool 482 which can be held stationary. Other arrangements can be employed.

Heated expanded tool 482 preferably heats flow pipe 400 to a temperature suitable for plastic deformation, e.g., the glass transition temperature, where flow pipe 400 can be expanded to a larger inner diameter. As shown in FIG. 18B, expanded flow pipe 400 then slides over cooling mandrel 484 having a diameter suitable for setting flow pipe 400 at its expanded configuration.

Insulating section 486 preferably is provided between heated expanded tool 482 and cooling mandrel 484. Optionally, collar 488 can be employed to prevent expansion of the outer pipe.

Insulated pipe segments formed using, e.g., a heated expanding tool and a cooling mandrel could be joined together to form longer pipe-in-pipe assemblies. Many techniques for joining ends of plastic piping are known. Examples include solvent based techniques such as used in PVC drain piping, end melting, and so forth.

Alternatively, or additionally, outer pipe can be compressed, using, for instance, a swaging tool. Swaging tools are known in the art.

As the inner pipe is expanded and/or outer pipe is compressed, the insulating layer is compressed and air contained with the particulate material in the annular space is expelled through the material of the end caps.

Similar approaches can be used to fill the annular space with a monolithic insulating material, e.g., an aerogel blanket. While thermal conductivity of aerogel blankets can be somewhat higher than that of some aerogel particles, blankets are easy to install. For example, they can be cut to length without particles spilling out.

Figure 19:
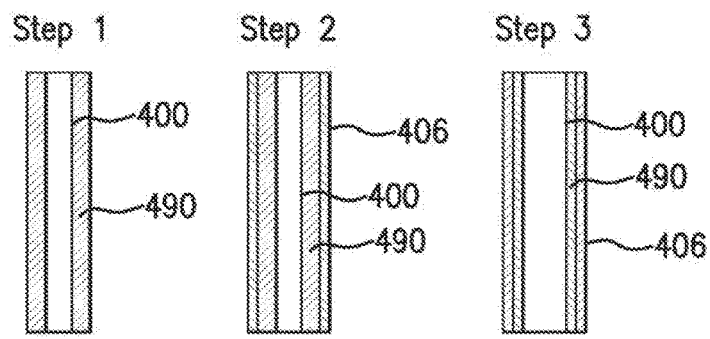
FIG. 19 is a diagram illustrating steps conducted to compress a monolithic insulating material by expansion of a flow pipe.

Shown in FIG. 19 is a possible sequence of steps that can be employed to assemble a pipe-in-pipe assembly in which the annular space is filled with a monolithic material, e.g., an aerogel blanket.

In Step 1, flow pipe 400 is covered with a monolithic insulating material to form insulating layer 490. Preferably, insulating layer 490 is formed by wrapping the monolithic material, e.g., aerogel blanket around flow pipe 400. Continuous wrap, section "barrel wrap" or other type of wrap can be utilized. In a preferred example wrapping is the same or similar to wrappings used on tennis racket handles and can be wound around flow pipe 400 once or more than one times.

Optionally, the monolithic insulating layer is covered by a sheath, made, for instance, of plastic material, e.g., film. The sheath can protect the monolithic insulator during installation, it can compress the blanket and/or can provide a surface for attaching or bonding other materials. The sheath can be obtained by continuously wrapping a plastic material along the length of the pipe or by direct extrusion of a plastic material over the insulating layer. If continuous wrapping is employed, an induction heater or another suitable device can be used to soften and/or partially melt the plastic material, thereby bonding the sheath to itself.

In Step 2, flow pipe 400 covered with insulating layers 490 is slipped into outer pipe 406.

In Step 3, the insulating layer is compressed, e.g., by one or more of the techniques with respect to loose fill insulators.

In some embodiments, a sheath, concentrically wrapped material, or cladding may be used as an inner and/or outer pipe. These may be made of fiberglass, elastomers, thermoset polymers, thermoplastic polymers, and composites (e.g., fiber-reinforced polymers), high density polyethylene (HDPE), aluminum or other suitable materials and combinations thereof.

In further aspects, the invention is directed to insulated pipe arrangements in which the outer pipe is eliminated. Elimination of the outer pipe simplifies manufacturing and installation processes, facilitates deployment and can be lighter.

Without an outer pipe, the insulated pipe arrangement can be thought of as a pipe structure having a pipe and an insulating material at the outer surface of the pipe. In many instances the pipe is a flow pipe. In other cases, the conduit formed by the pipe can include other structures or devices, e.g., inner pipe(s), tube(s), wire(s), cable(s) and so forth.

In specific implementations, the insulating material is monolithic and preferably flexible, e.g., a cracked monolithic aerogel material, aerogel blanket, a composite monolithic aerogel material, and so forth.

To form such a pipe structure, a flexible monolithic insulating material can be wrapped around a pipe, e.g., a flow pipe, for instance as on the grip section of a tennis racket.

Neighboring wraps preferably are positioned to minimize gaps in insulation. For a smooth cross-sectional profile, bumps or bulges are avoided. One or more than one layer(s) of monolithic insulator can be wrapped around the pipe to a desired thickness, which can be tailored to meet the requirements of the intended use.

Flexible containers such as described above, notched containers also can be employed to form the insulating layer. The container can be positioned around the outer surface of the pipe or can be "wrapped" around the pipe, essentially as described above.

Once the insulating layer has been disposed at an outer surface of the pipe, it can be covered with one or more layers made of a polymeric material, e.g., an elastomer, a thin metal film or from another suitable material.

A preferred implementation of the invention uses an extrusion process to form a layer that covers and preferably compresses the insulating material, e.g., to increase its insulating properties.

Figure 20:
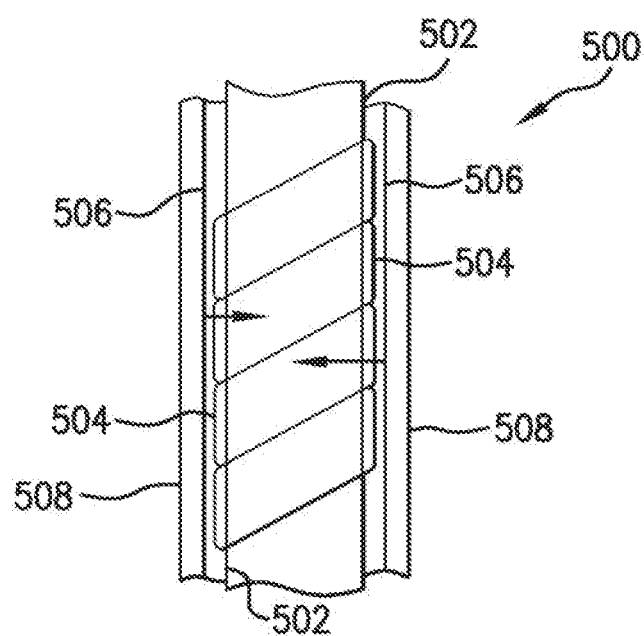
FIG. 20 is a longitudinal cross section of an insulated pipe arrangement of the invention.

FIG. 20 is a cross-sectional view of pipe structure 500 including pipe 502, e.g., a flow pipe, and insulating material 504 wrapped around the pipe. Cover layer 506 can be provided to compress insulating material 504 in the direction of the arrows.

For added mechanical strength and/or protection, the exterior surface of cover layer 506 optionally can be covered by additional layer 508. For instance, if cover layer 506 is made of a polymeric material, additional layer 508 can be made of a metal.

By selecting appropriate materials and dimensions, a multi-layer insulated pipe arrangement such as described above can be designed to meet requirements of most applications while eliminating the outer pipe of pipe-in-pipe assemblies.

In some implementations, a cavity such as the annular space in a pipe-in-pipe arrangement is insulated with a combination of loose particulate material, e.g., aerogel, and material enclosed in a container or pack, e.g., a vacuum packaged granular aerogel held in a container that can be breached. The packaged material is placed in the space and then any open cavities are filled with loose particulate material. Any ratio between the two materials can be employed. In specific embodiments, relative amounts of particulate insulator enclosed in the container and loose particulate insulator are selected to generate compression, preferably significant compression, e.g., 25-35% in the insulating system once the container is breached. Generally, increasing the relative amount of insulator held in a container results in increased amount of compression in the system, thereby improving its thermal performance.

While this invention has been particularly shown and described with references to preferred embodiments thereof, it will be understood by those skilled in the art that various changes in form and details may be made therein without departing from the scope of the invention encompassed by the appended claims.

What is claimed is:

1. An insulated pipe structure comprising:
   a. a pipe having an outer surface;
   b. a notched or bubble wrap container comprising a granular insulating material wrapped over the outer surface to form an insulating layer, and
   c. at least one layer surrounding an exterior surface of the insulating layer, wherein the at least one layer compresses the insulating layer.

2. The insulated pipe structure of claim 1, wherein the at least one layer is formed by extrusion.

3. The insulated pipe structure of claim 1, further comprising a protective layer at an outer surface of the at least one layer.

4. The insulated pipe structure of claim 1, wherein the insulating material includes aerogel.

5. An insulated pipe structure comprising:
   a. a pipe having an outer surface;
   b. a granular insulating material at the outer surface, wherein the granular insulating material is in a notched or a bubble wrap container; and
   c. an optional cover layer.

6. A method for manufacturing a pipe-in-pipe assembly, the method comprising:
   introducing, in an annular space between a flow pipe and an outer pipe, an insulating material that is not encased to form a container;
   expanding the flow pipe to reduce the annular space, thereby compressing the insulating material present in the annular space, thereby producing a pipe-in-pipe assembly having the flow pipe set at an expanded configuration.

7. The method of claim 6, further comprising introducing the insulating material into the annular space.

8. The method of claim 6, wherein the insulating material includes aerogel.

9. The method of claim 6, wherein the flow pipe is expanded by a tubing expander or by a swaging tool.

10. The method of claim 6, wherein the flow pipe is fabricated from a polymeric material.

11. The method of claim 10, wherein the flow pipe is expanded using a heated expanding tool.

12. The method of claim 11, further comprising contacting the heated flow pipe with a cooling mandrel.

13. The insulated pipe structure of claim 1, wherein the at least one layer compresses the insulating layer to increase its insulating properties.

14. The insulating pipe structure of claim 5, wherein the insulating material is granular.

15. The insulating pipe structure of claim 5, wherein the container is notched with indentations that are made into but not through the container.

16. The insulating pipe structure of claim 5, wherein the container is notched and has a flat side positioned at the outer surface.

17. The insulated pipe structure of claim 5, wherein the container is notched and is prepared by a method comprising introducing indentations in a flat container, wherein the flat container encloses the granular insulating material.

18. The insulated pipe structure of claim 17, wherein the indentations are introduced by a die having shaped teeth.

19. The insulated pipe structure of claim 5, wherein the container is notched by introducing indentations to the container, thereby compressing the insulating material in the container.

20. The insulated pipe structure of claim 5, wherein the container is in bubble wrap form and is prepared by a method including feeding granular insulating material to a bubble wrap machine.

* * * * *